July 17, 1928.

H. I. MORRIS

CORD FABRIC AND TIRE MAKING MACHINE

Original Filed Aug. 8, 1918   12 Sheets-Sheet 1

1,677,400

Inventor,
by
his Attorney.

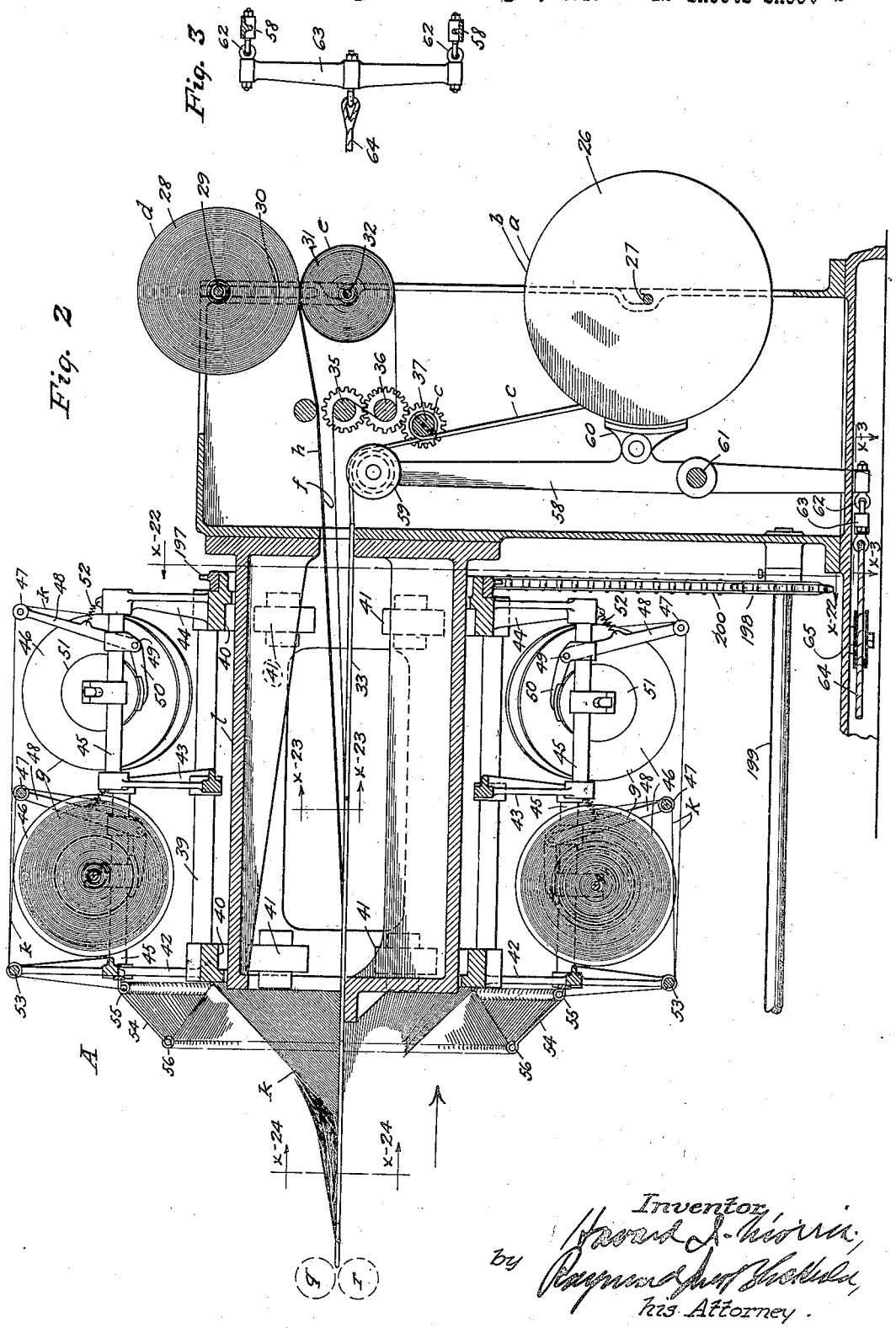

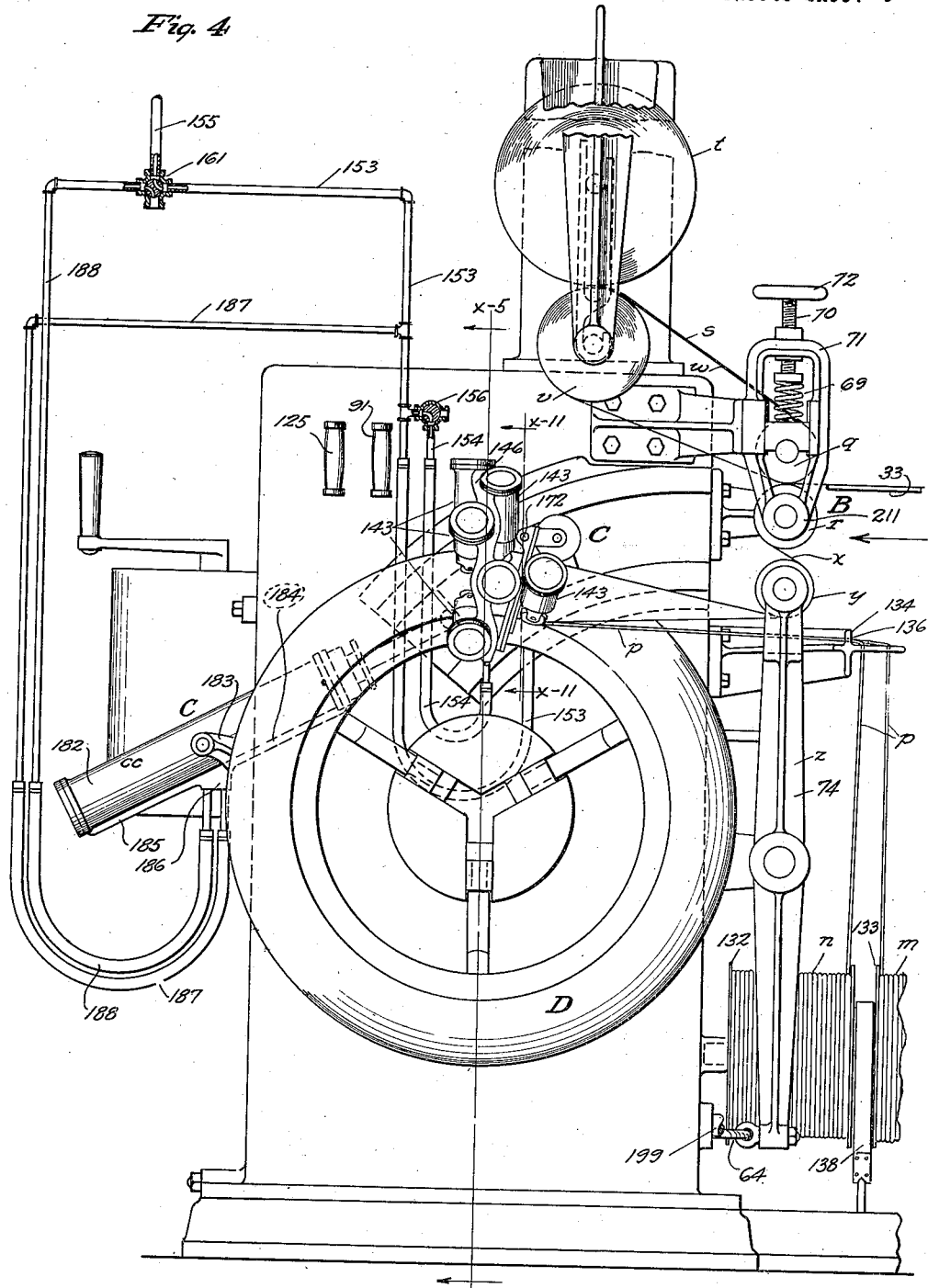

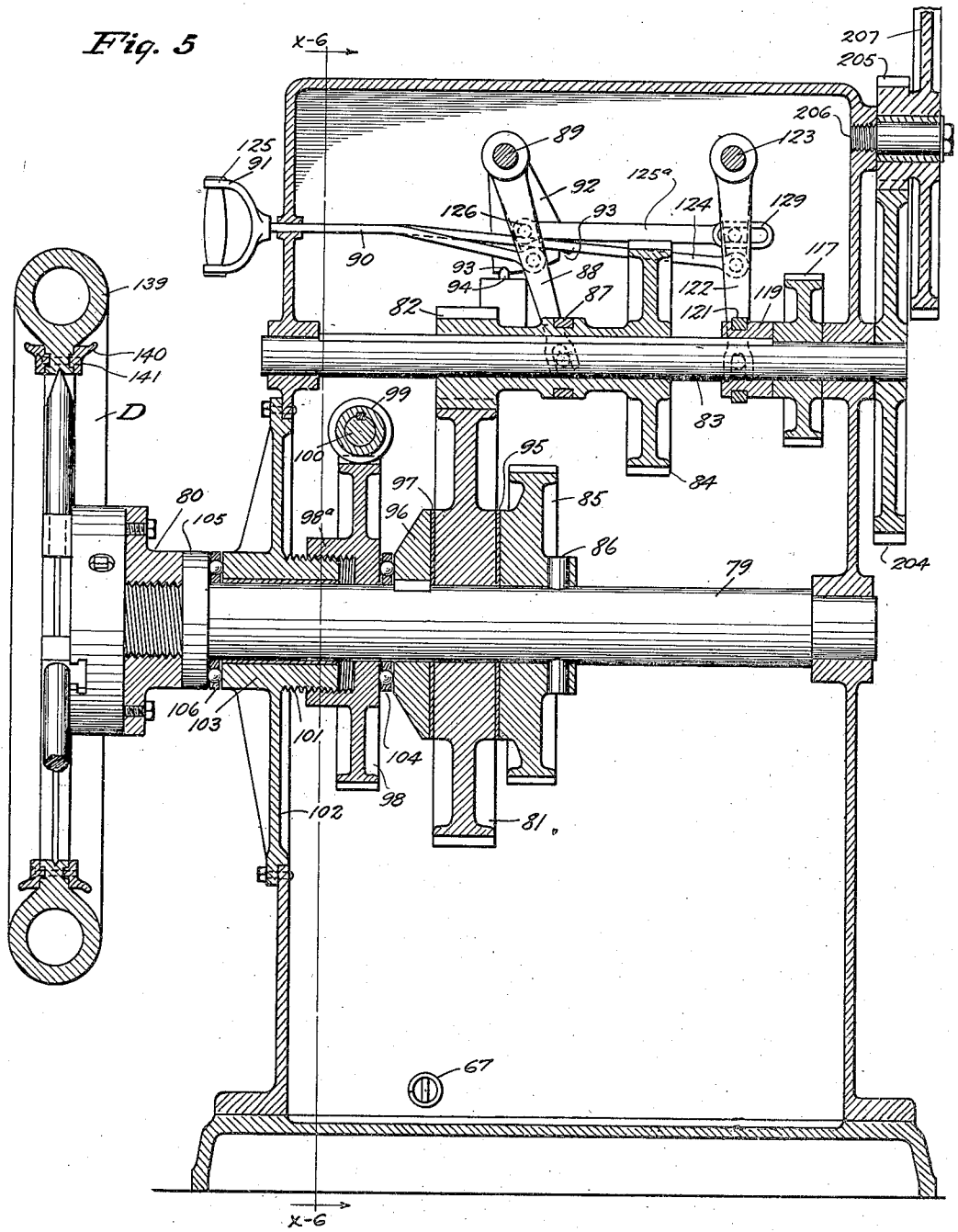

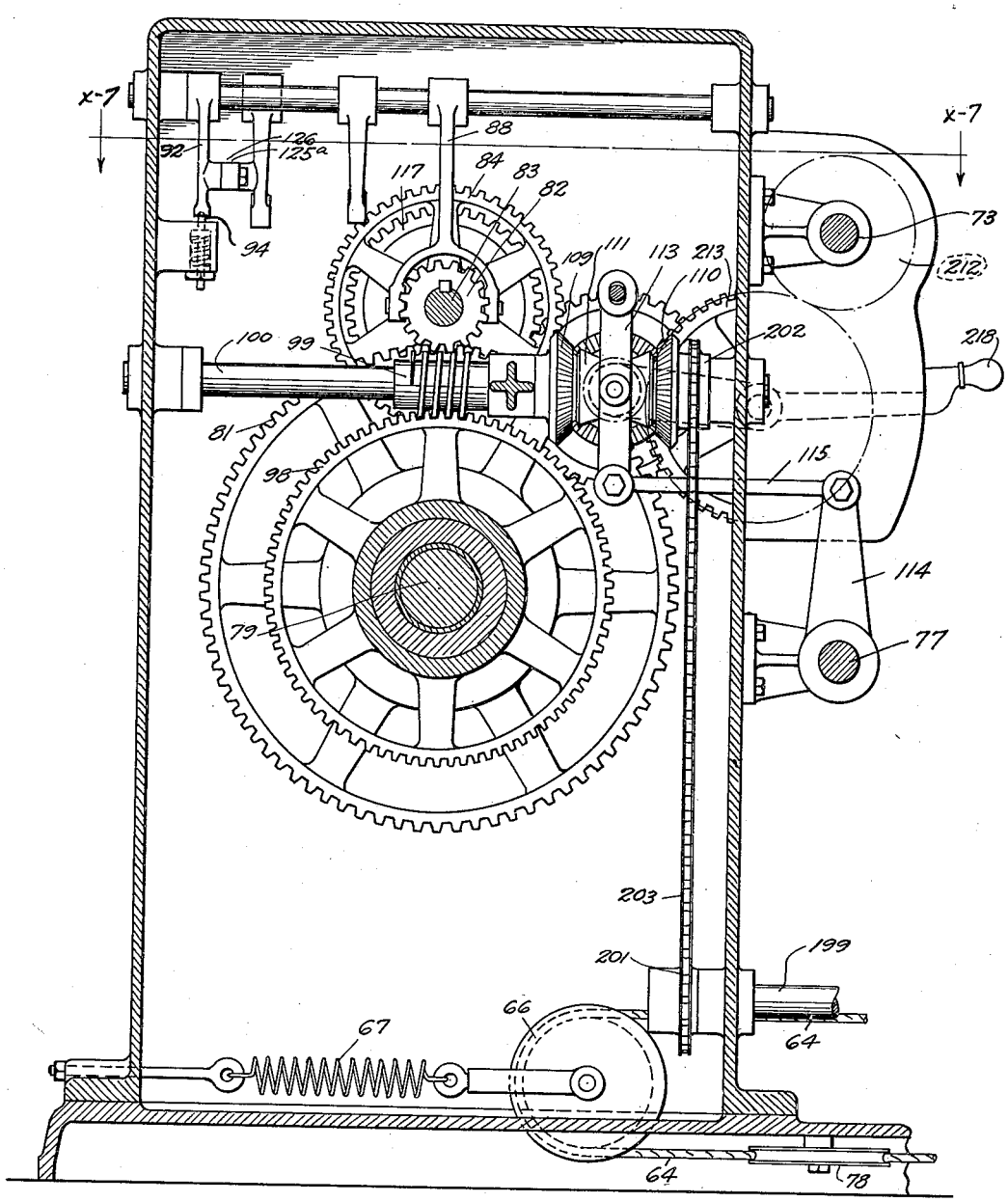

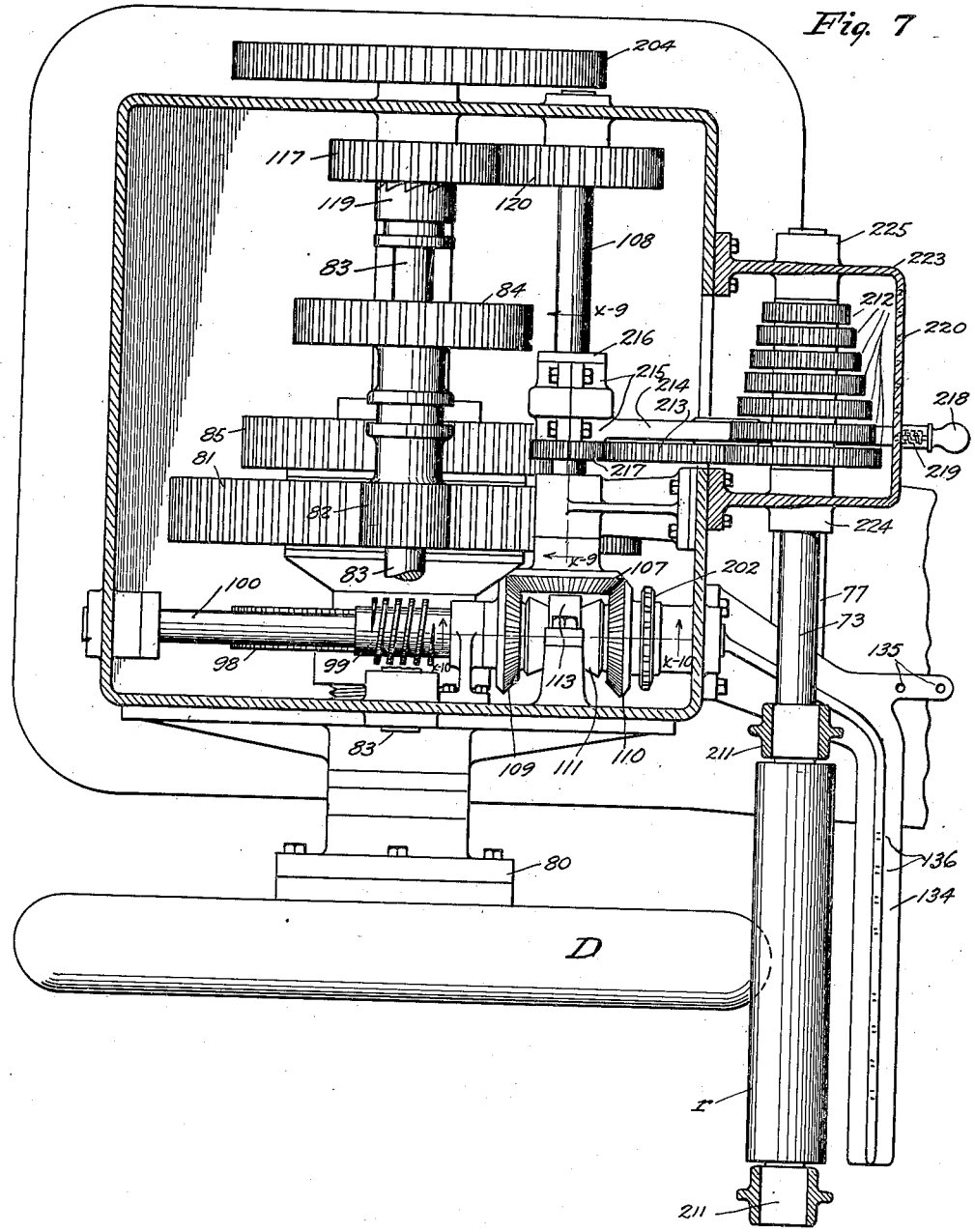

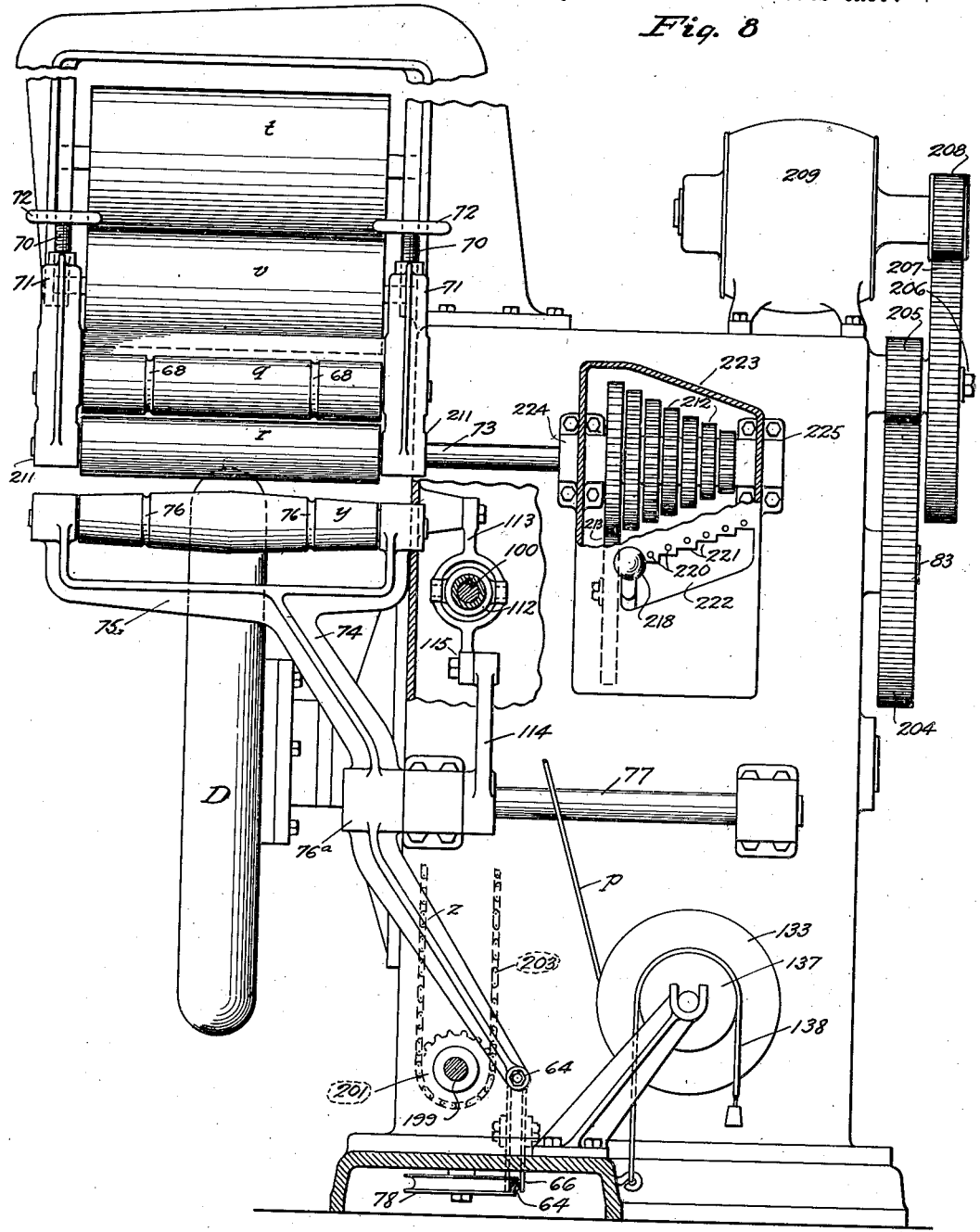

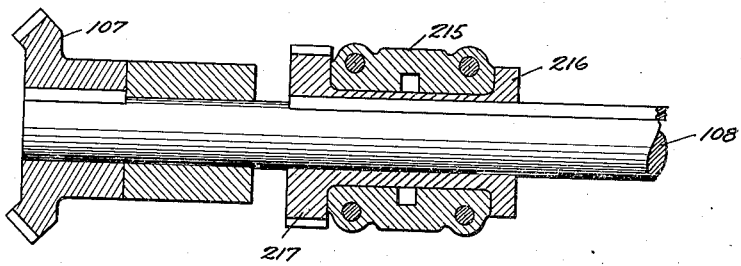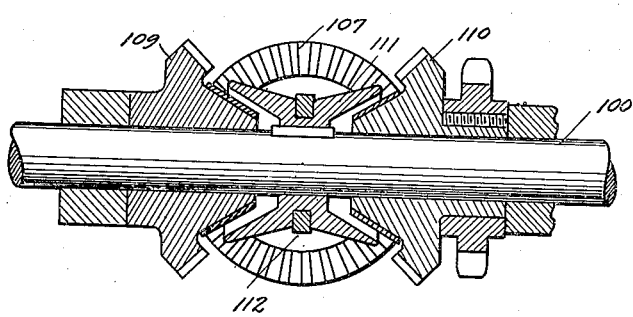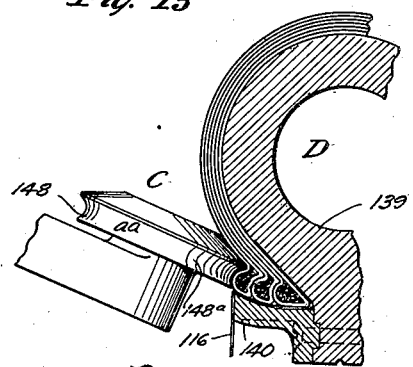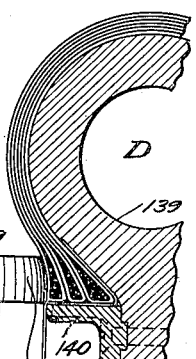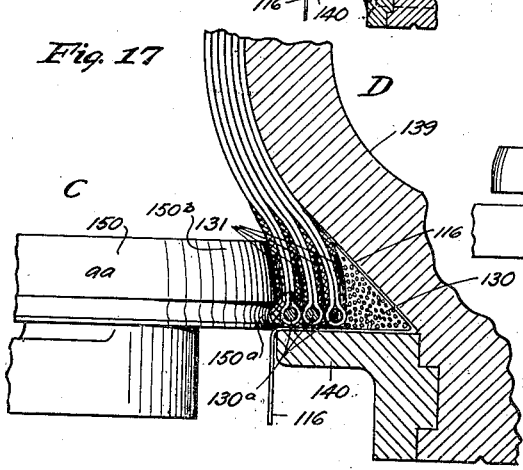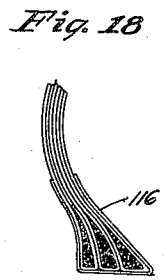

July 17, 1928.
H. I. MORRIS
CORD FABRIC AND TIRE MAKING MACHINE
Original Filed Aug. 8, 1918    12 Sheets-Sheet 9
1,677,400
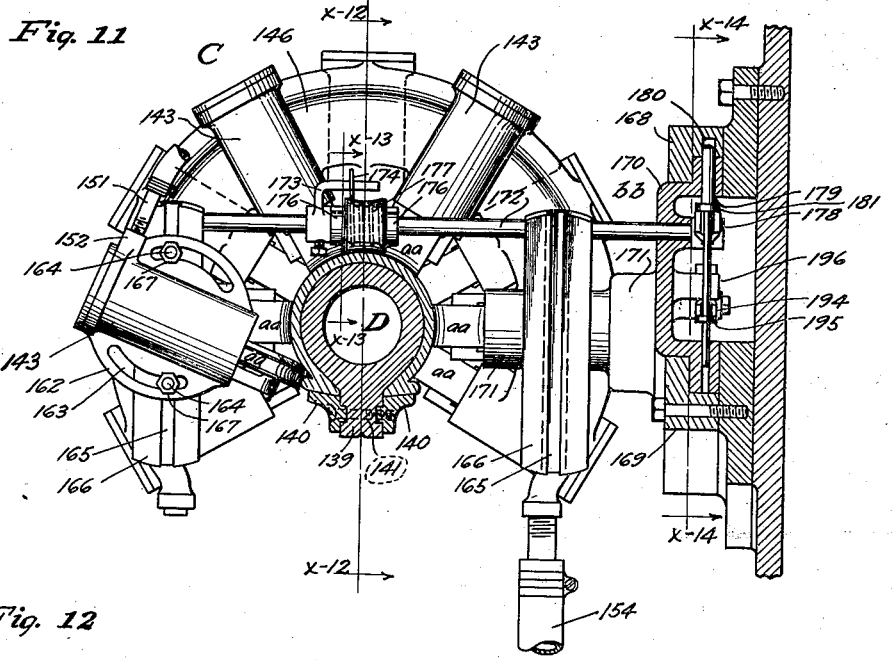
Fig. 11
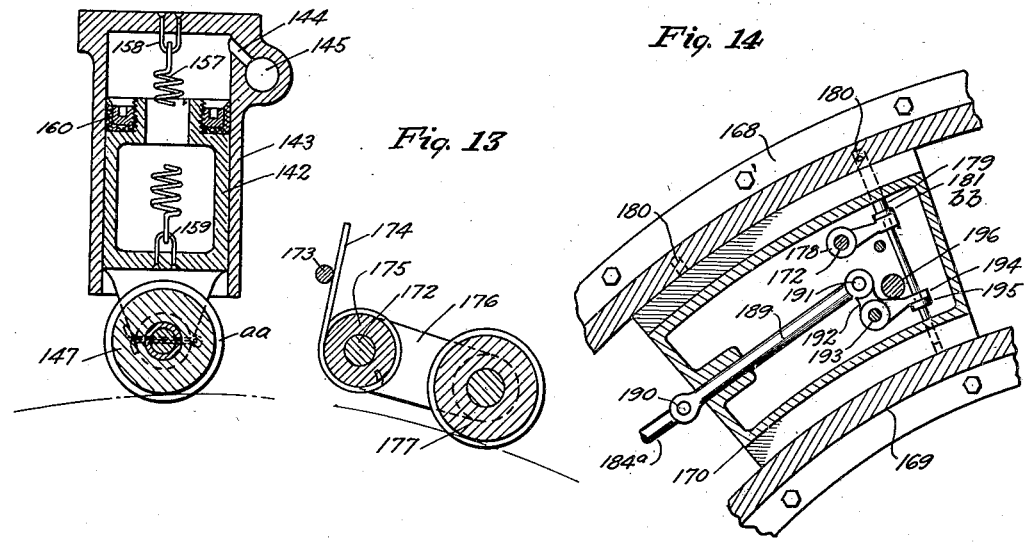
Fig. 12
Fig. 13
Fig. 14
Inventor
Howard I. Morris
by
his Attorney, July 17, 1928.

H. I. MORRIS 1,677,400

CORD FABRIC AND TIRE MAKING MACHINE

Original Filed Aug. 8, 1918   12 Sheets-Sheet 10

Inventor,
Howard I. Morris,
by
his Attorney.

July 17, 1928.  
H. I. MORRIS  
CORD FABRIC AND TIRE MAKING MACHINE  
Original Filed Aug. 8, 1918   12 Sheets-Sheet 11

1,677,400

Inventor,
Howard I. Morris;
by
his Attorney.

July 17, 1928.

H. I. MORRIS

CORD FABRIC AND TIRE MAKING MACHINE

Original Filed Aug. 8, 1918      12 Sheets-Sheet 12

Inventor

Patented July 17, 1928.

1,677,400

UNITED STATES PATENT OFFICE.

HOWARD I. MORRIS, OF CLEVELAND, OHIO, ASSIGNOR TO THE CORD TIRE MACHINE COMPANY, OF CLEVELAND, OHIO, A CORPORATION OF ARIZONA.

CORD-FABRIC AND TIRE MAKING MACHINE.

Application filed August 8, 1918, Serial No. 532,039. Renewed January 26, 1922.

This invention relates to machines for making what is known in the fabric tire making art as cord fabric, and for forming up such cord fabric with suitable bead structures into vehicle tires. In so far as the invention relates to machines for making such cord fabric it is to be understood that no limitation is to be impliedly placed upon the handling of such cord fabric by any specific machine or in accordance with any specific method or process pertaining to the manufacture of tires. In other words, in so far as the manufacture of the cord fabric itself is concerned, the machine features and aspects of the present invention are distinct and separate therefrom. However, the machine of the present invention is so organized as a single working entity that in itself it not only produces the cord fabric, but, with the associated bead elements, it utilizes the same in the making of a tire, so that the final output of the machine is a completed tire carcass composed of the cord fabric which the machine makes, together with the bead elements which are associated with such cord fabric in so making the tire.

The invention has for its object the provision of an improved machine for making cord fabric and cord fabric tires, which will be superior in point of efficiency, facility in control, positiveness in operation, and quantity of output per time unit, and the elimination of waste material, and which will be generally superior in serviceability. A further object consists in the provision of such a machine as will turn out a cord fabric and tire product which will be superior in strength and durability and inherent stability and strength of bead formation of such tire product. In accordance with the present invention I provide means for feeding or supplying the textile strands for the production of the cord fabric, together with means for simultaneously feeding bead elements and sheet rubber, shuttle means being provided for roving successive courses of the textile strands around the bead elements and the sheet rubber. The sheet rubber is fed in conjunction with, or using as a vehicle, muslin or other textile spacing strip or sheet which is wound into the rolling sheet rubber, such spacing sheet serving to conduct the sheet rubber beyond the point at which the cord fabric strands are applied to the same and the bead elements. Means are then provided for consolidating the resultant product by intimately pressing together the sheet rubber and the courses of fabric wound in helical progression around the same. To the product thereupon resultant I apply a further sheet of rubber which is laid into the channel last produced between the bead elements and the product is then conducted to the core to be thereon formed into the carcass, pressure means being provided for consolidating successive courses of such tire carcass material and likewise for consolidating the successive courses of bead structure. Means are provided for automatically centering such pressure means with respect to the core, and such pressure means comprise a plurality of pressure elements or members, each of which is separately actuated, preferably by pneumatic pressure, as against which spring tension is opposed, the members being so yieldingly mounted as to accommodate the thickening carcass. I likewise provide a frictional drive for the core for accommodating by automatically regulated slippage any variation in a pull upon the tire-forming material as the same is applied to the core. In accordance with the invention I provide rollers which receive the tire-forming material, namely, the two layers of sheet rubber and the cord fabric material rove about the same, together with the bead forming material at each side. These rollers are operated at a constant set speed. The core, as above pointed out, is operated through the agency of a drive including a friction clutch providing for slippage, so that the peripheral speed upon the core, or at the periphery of the forming carcass is constant. However, as the bead forming material continues to be withdrawn from the drum or spool carrying the same, its peripheral speed at such drum or spool increases. In order to maintain a fixed working relation between the speed of core rotation and the speed of rotation of such drum or spool, I provide a tension device controlled in turn by the tension of the tire forming material as it passes about a master roll, such roll being freely mounted so as to be responsive to such variations in tension of such material, and in its movement controlling the movement of the clutch means for the shaft which controls the drive of the core. This master roll in its movement is opposed tensionally as by the tension device above mentioned. Thus this tension device in its effect is offset at all times against the pull on the tire-forming material fed about such master roll. This tension device likewise, in an independent relation, acts upon a suitable brake means applied to the rolls or spools of bead forming material, so as to prevent the over-running of the same and limit the feed from such rolls to exactly the requirements predicated upon the pull of the tire-forming material past said master roll. It will be understood that the variation in the drive of the core provided by the clutch mechanism above mentioned is required to compensate for the variation in peripheral speed at the forming carcass upon the core made necessary by the fact that the first rolls by which the tire-forming material is received, namely, the material consolidating rolls, which are at a constant speed and thus advance such material at a constant speed through and beyond them.

I also provide in accordance with the invention a core so organized as to cooperate with bead forming means for the building up of the bead as the material is supplied in successive courses upon the core, such bead-forming means comprising suitably-formed rolls which, together with rolling down rolls are adjustably mounted and preferably pneumatically actuated or urged as above set forth.

I also provide means for varying the speed of rotation of the consolidating rolls, independently of the means for operating the shuttle, at the same time driving both the consolidating rolls and the shuttle from the same source of power. Thus there is also, at any given moment of operation, a fixed relation between the operation of the consolidating rolls and the shuttle, although this fixed relation is variable as desired. It will be understood that in referring to these rolls as consolidating rolls we have referred to but one of their functions. Possibly their primary function may be said to be as feed rolls because they control and produce the advancement of the consolidated-forming and bead-forming material to the core at and upon which the tire is formed.

By a machine so organized, in carrying out the objects of the invention above stated, and accomplishing other objects which will be manifest, I provide for the complete production of a tire carcass, ready for receiving the rubber portions, and in a continuous operation, and including bead structures. It will be obvious that the invention thus eliminates many performances and steps and acts, manual and otherwise, which are incident to the usual process or method of tire building. I believe that never before has a machine been devised for performing all of these various steps in a continuous unbroken sequence, and particularly including the formation of the bead structures.

With the above and other objects in view, the invention consists in the novel and useful provision, formation, combination, association, inter-relation and operation of parts, members and features, all as hereinafter described, shown in the drawings, and finally pointed out in claims.

In the drawings:

Figure 2 is an enlarged detail longitudinal sectional view taken upon the line $x^2$—$x^2$, Figure 1, and looking in the direction of the appended arrows;

Figure 3 is a detail transverse sectional view taken upon the line $x^3$—$x^3$, Figure 2, and looking in the direction of the appended arrows;

Figure 4 is an enlarged fragmentary side elevation of the features and members of the machine to which the tire-making and bead-forming fabric is passed from the features and members shown in Figure 2, such fabric being drawn or advanced by the feed or consolidating rolls shown in Figure 1.

Figure 5 is a still further enlarged detail transverse sectional view taken upon the line $x^5$—$x^5$, Figure 4, and looking in the direction of the appended arrows, parts being in elevation and parts being omitted for clearness of illustration;

Figure 6 is a detail vertical longitudinal sectional view taken upon the line $x^6$—$x^6$, Figure 5, and looking in the direction of the appended arrows;

Figure 7 is a horizontal detail sectional view taken upon the line $x^7$—$x^7$, Figure 6, and looking downwardly, parts being omitted for clearness of illustration;

Figure 8 is a vertical transverse substantially mid-section of the machine shown in Figure 1, taken approximately at the right-hand side of the showing in Figure 4 and looking in the direction of the large arrow in that figure, the plane of such section being indicated by the line $x^8$—$x^8$, Figure 1, arrows indicating the direction of vision;

Figure 9 is a detail vertical sectional view, upon an enlarged scale, taken upon the line $x^9$—$x^9$, Figure 7, and looking in the direction of the appended arrows;

Figure 10 is a detail vertical longitudinal sectional view taken upon the line $x^{10}$—$x^{10}$, Figure 7, and looking in the direction of the appended arrows;

Figure 11 is a detail vertical transverse sectional view taken upon the line $x^{11}$—$x^{11}$, Figure 4, and looking in the direction of the appended arrows, the tire-forming and bead-forming pressure means being shown completely in elevation, with the exception of one element omitted for clearness of illustration;

Figure 12 is an enlarged fragmentary vertical longitudinal sectional view taken upon the line $x^{12}$—$x^{12}$, Figure 11, and looking in the direction of the appended arrows;

Figure 13 is a detail longitudinal vertical sectional view, upon an enlarged scale, taken upon the line $x^{13}$—$x^{13}$, Figure 11, and looking in the direction of the appended arrows;

Figure 14 is a detail enlarged longitudinal sectional view taken upon the line $x^{14}$—$x^{14}$, Figure 11, and looking in the direction of the appended arrows;

Figure 15 is an enlarged fragmentary transverse sectional view, being in part the showing in Figure 11 and more clearly and in detail illustrating the operation of the bead-forming means whereby in conjunction with the core and the bead molding ring thereon the overlying bead courses are consolidated and formed into the completed bead;

Figure 16 is a view similar to Figure 15 of a modified form of bead roll and bead molding ring, illustrating the consolidation of the several courses of the bead formation and the mode of completion of the bead structure in a straight side;

Figure 17 is a view similar to Figure 16 but illustrating a modified form of bead consolidating and forming roll operating in conjunction with a modified form of bead structure, as part of a straight side tire;

Figure 18 is a detail fragmentary view of the bead structure of a straight side tire, similar in disclosure to the corresponding features of Figure 16 with the addition of a bead enclosing envelope which is likewise shown as partially in place in Figure 17;

Figure 24:
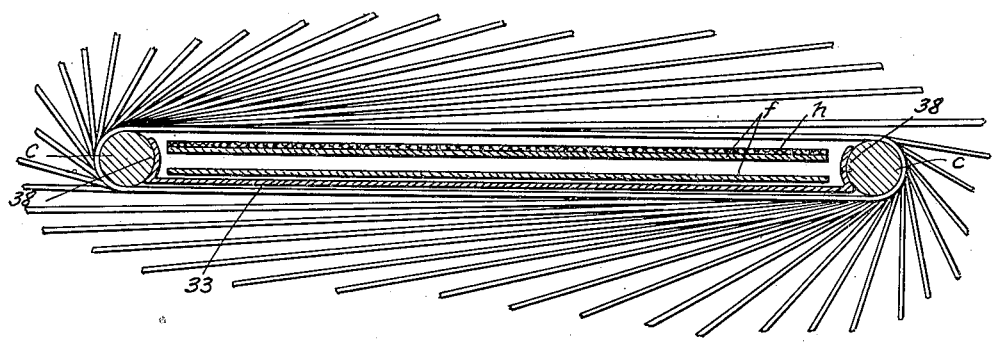
Figure 25:
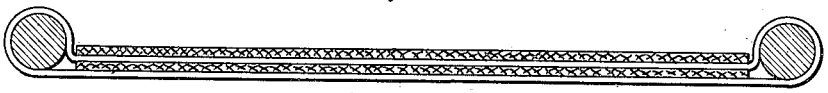
Figure 26:
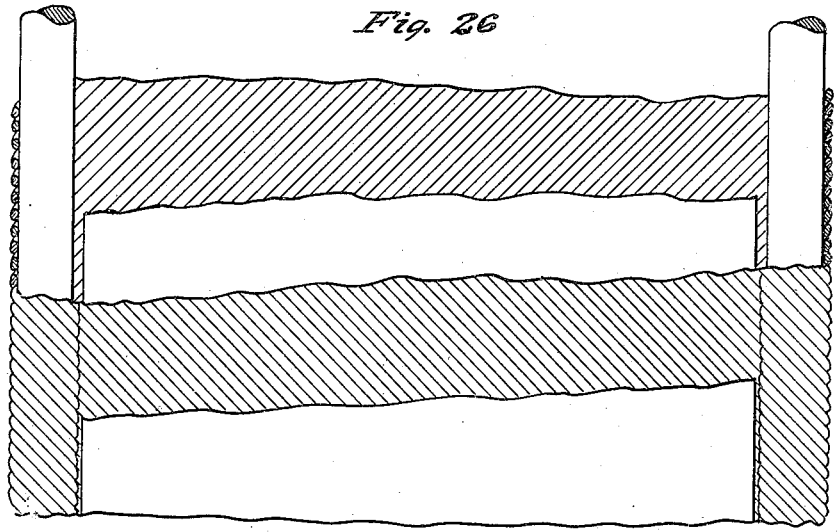

Figure 24 is an enlarged detail transverse sectional view taken upon the line $x^{24}$—$x^{24}$, Figure 2, and looking in the direction of the appended arrows, through the partially completed bead and tire fabric, and certain features of the machine and the textile conveyer for such partially completed fabric, the fabric being in that stage of development which next precedes the application of the second rubber sheet and a consolidation of the same with the partially completed fabric at the feed or consolidating rolls shown in Figure 4;

Figure 25 is an enlarged transverse sectional view of the completed bead and tire fabric after the same has passed the feed and consolidating rolls and is to be supplied to the core; and, Figure 26 is a fragmentary face of plan view, broken away in parts for clearness of illustration, of bead and tire fabric formed and organized in accordance with the present invention.

Figure 1:
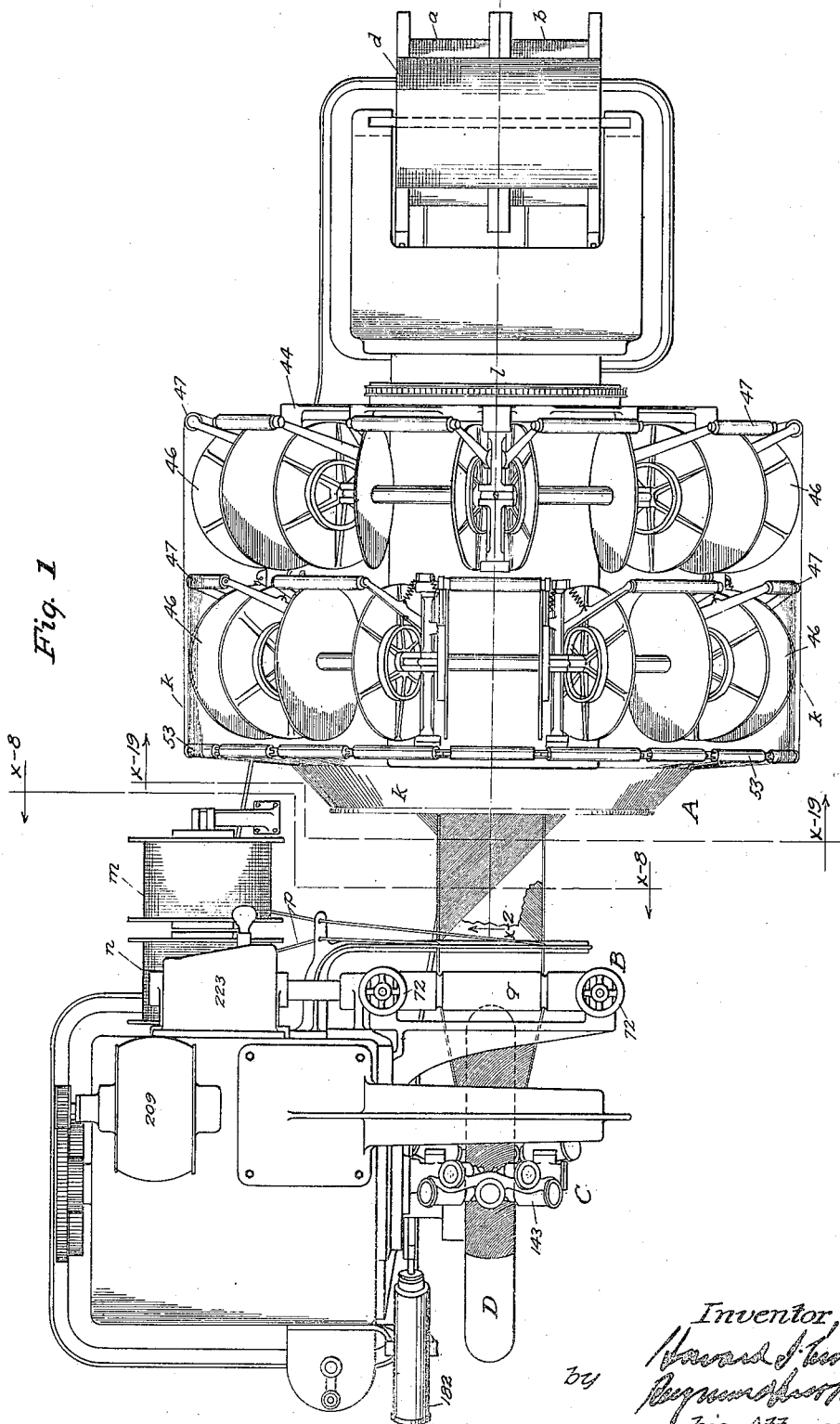
Figure 1 is a plan view of a cord fabric and tire-making machine constructed and organized in accordance with the invention.

Referring to the drawings, the particularly organized machine therein disclosed as embodying the invention, in one such possible embodiment, comprises in the main, referring particularly to Figures 1, 2 and 4, means A for partially forming tire and tire bead fabric, means B for completing the formation of such fabric and consolidating the same in form for use in tire formation, and means C for utilizing such bead and tire fabric in the formation of a tire upon a core D. Of course the present machine functions completely for the manufacture of such bead and tire fabric and the formation of tires thereof, whereby in continuous operation the various elements of the fabric are brought together and consolidated and then supplied to the tire-forming features of the machine. However, it will be understood that a principal function of the machine is the manufacture of such bead and tire fabric in and by itself irrespective of the particular means and features, such as exemplified in the drawings, whereby such fabric is converted into a tire structure. Therefore, while the machine is a complete entity and its parts are all truly combined to carry on in continuous operation the manufacture of bead and tire fabric and its conversion into tire structure, the invention is not to be understood to be limited to any necessary combined use of the bead and tire fabric-making means and the bead and tire fabric converting means. It will be understood that other substitute or equivalent means may be employed for the manufacture of the fabric on the one hand or for the conversion of the fabric into tires on the other hand, and that invention inheres in each of these several elements and features irrespective of the invention which has to do with the combination thereof and the resultant combinative effect. The means A for partially forming tire and bead fabric comprises in the main members $a$ and $b$ for supplying bead-forming material $c$, in separate strands, a member $d$ for supplying sheet rubber, a member $e$ for taking up the textile spacing sheet $f$ which is wound into the roll of sheet rubber supplied by the means $d$, and a member *g* for wrapping or winding about the bead material *c* and the sheet rubber *h* textile strands, cords or threads *k*. Such member *g* comprises a shuttle element revolving about a tubular central support *l* through which the bead material *c* and the sheet rubber are fed. *m* and *n* designate respectively members for supplying auxiliary material, for example, auxiliary bead material, in strand, cord, thread, tape or other extended form, the same if desired being fed to the means C for forming the tire and its beads upon the core D. The means B for feeding and consolidating the partially formed bead and tire fabric which is organized by the means A above generally described, comprises two feed and consolidating rolls *q* and *r*, the former of which is an idler, and which rolls jointly act upon the partially completed fabric, drawing it, and by preference a second rubber sheet *s*, to themselves and consolidating such fabric and the second rubber sheet *s* into a web. The rubber sheet *s* is supplied by a member *t*, supported on the frame of the machine in any desired manner. *v* designates a member for taking up the spacer sheet *w* of muslin or the like, which is wound into the roll provided at the member *t*. The finally completed and consolidated bead and tire fabric *x* passes from the feed and consolidating rolls *q* and *r* about a master roller *y* included in a member *z* for varying the degree of positiveness of torque at the core in ratio with variations of pull or tension upon the completed fabric *x*. The feed and consolidating roller *r* is positively driven as hereinafter described.

I will now describe in detail the construction of the several means and their members as above generally located. The members *a* and *b* comprise drums or rollers 26 rotatably mounted upon arbors 27 and from which respectively the strands of bead material *c* are drawn by the feed rolls *q* and *r*. Likewise the first sheet rubber element *h* is drawn from a drum or spool or roller 28. The roller 28 is preferably rotatably mounted upon an arbor 29 in suitable vertical guides 30 so as to be always in frictional contact with the periphery of a roll 31 of the taken-up spacer sheet *f* which roll is rotatable upon an arbor 32 beneath the arbor 29. A platen 33 extends horizontally beneath the path in which the first rubber sheet *h* and its spacer fabric sheet *f* are advanced by the feed rolls *q* and *r* extending through the tubular support *l* for the shuttle member *g*. At the left-hand end of the platen 33, as Figures 1 and 2 are read, is provided a guide rod about which the muslin or other textile fabric *f* is rove and whereby such fabric is caused to double upon its course and returns to and over driven rolls 35 and 36 adjacent to the roller or drum 31, by which such returned fabric is taken up. The driven rollers 35 and 36 are operated by a positively operated drive roller 37 about which is rove the two bead material strands *c*, whereby the return of the muslin to the roll 31 is caused to be in exact step with the feed of such bead material strands *c* as about to be described. Such strands *c* are drawn lengthwise of the platen 33, in guide channels 38 at the side edges of such platen, and the first rubber sheet *h* with its underlying course of fabric *f* traverses the upper surface of the platen, or descends to such upper surface in the advance of the bead material strands *c* and such first rubber sheet *h*, and its textile underlying conveyer *f* are subjected to the wrapping or winding treatment of the threads or strands *k* supplied by the shuttle member *g*. It will thus be seen that the upper course of the fabric *f* serves as a conveyer for the first rubber sheet *h* to and beyond the point at which the textile strands or cords *k* are wrapped about such first rubber sheet and conveyer and platen and bead material strands. The textile material is returned and wrapped upon the roll 31 in a lower course of travel, and the bead strands *c* together with the first rubber sheet *h*, both wrapped in the strands or cords *k* applied in the rotation of the shuttle member *g*, are drawn from the end of the platen by the feed and consolidating rolls *q* and *r*.

Figure 19:
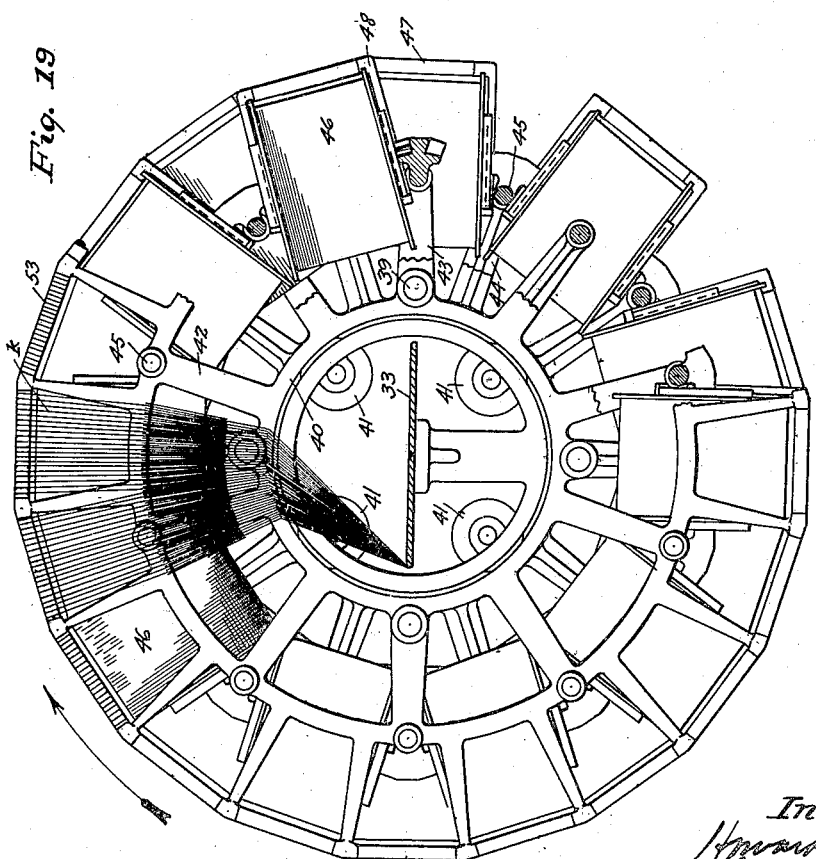
Figure 19 is a transverse vertical sectional view taken upon the line $x^{19}$—$x^{19}$, Figure 1, and looking in the direction of the appended arrows, being likewise a view looking in the direction of the large arrow in Figure 2, parts being broken away and sectioned for completeness of disclosure.
Figure 21:
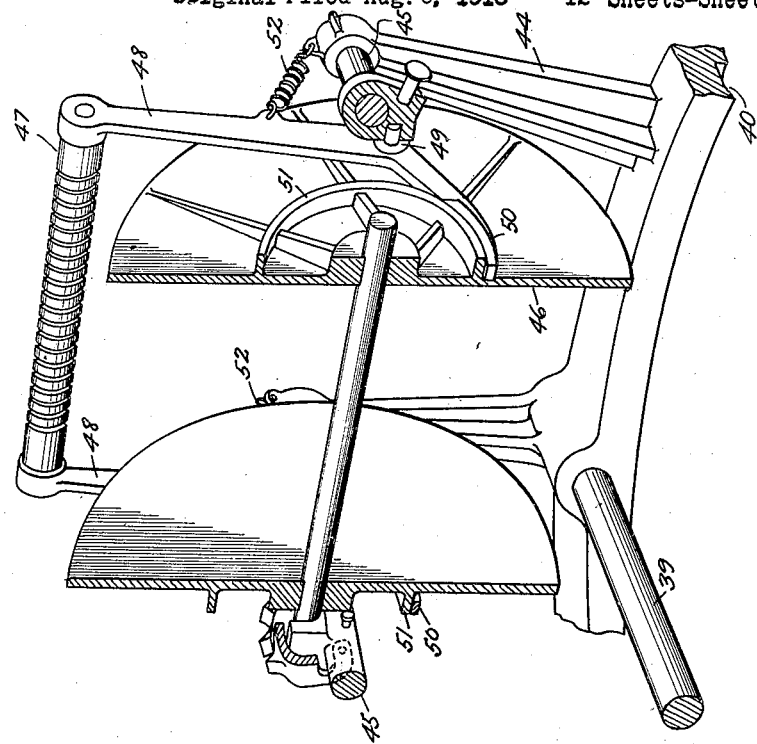
Figure 21 is an enlarged detail isometric partially sectioned view of one of the shuttle spools shown in the other figures and particularly in Figure 2.
Figure 22:
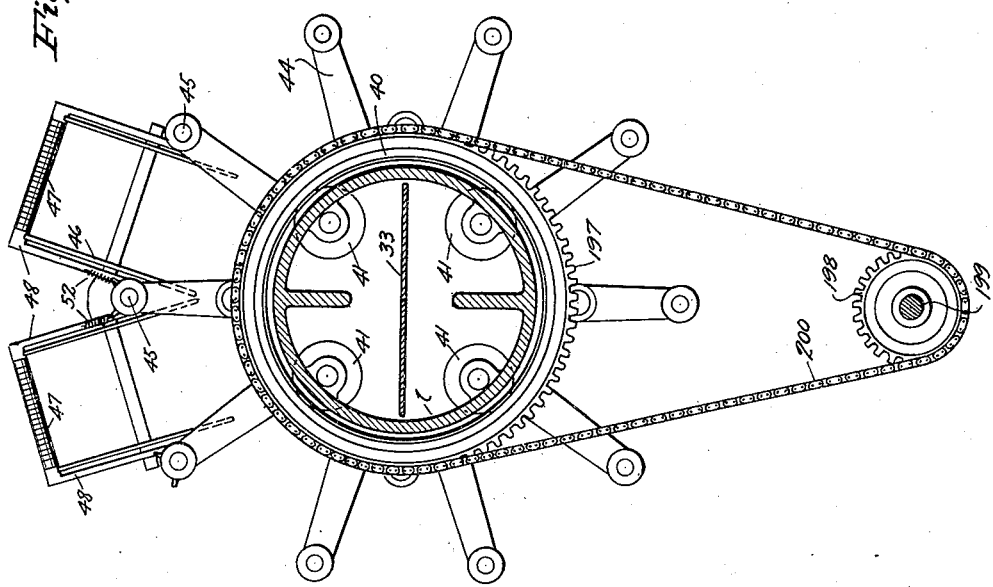
Figure 22 is a detail transverse vertical sectional view, taken upon the line $x^{22}$—$x^{22}$, Figure 2, and looking in the direction of the appended arrows, parts being omitted.
Figure 23:
Figure 23 is a detail transverse vertical sectional view, taken upon the line $x^{23}$—$x^{23}$, Figure 2.

The shuttle member *g* preferably comprises an annular revolving frame 39 adapted to turn upon the fixed tubular or hollow support *l*, being provided with tracks 40 which are in contact with rollers or bearings 41 mounted in the fixed central tubular support *l* and projecting through suitable openings therein for working contact with such tracks 40. Mounted upon this annular frame 39 are a plurality of radial spiders 42, 43 and 44, which carry spool supporting rods 45, preferably arranged longitudinally one series of which extends between the spiders 42 and 43 and the other series of which extends between the spider 43 and the spider 44. Upon these spool supporting rods are mounted revoluble spools 46 upon which is wound the material for wrapping or winding the bead material and first rubber sheet, such material being represented by the plurality of strands or cords *k*. As clearly shown in Figure 19 these spools or bobbins 46 are arranged in two continuous annular series, whereby the threads or strands *k* supplied from the same and drawn off by the advancement of the bead strands with the first rubber sheet, together with the rotation of the shuttle member *g*, are successively and intimately wound upon the said first rubber sheet and bead strands, together with the textile spacer strip *f*. As above stated, at the end of the platen 33 the bead strands and first rubber sheet, together with the winding or wrapping of the strands of the wrappings $k$ are drawn to and by the feed and consolidating rolls $q$ and $r$ for final completion of the bead and tire fabric including the consolidation thereof with the second rubber sheet $s$, when the latter is provided.

Figure 20:
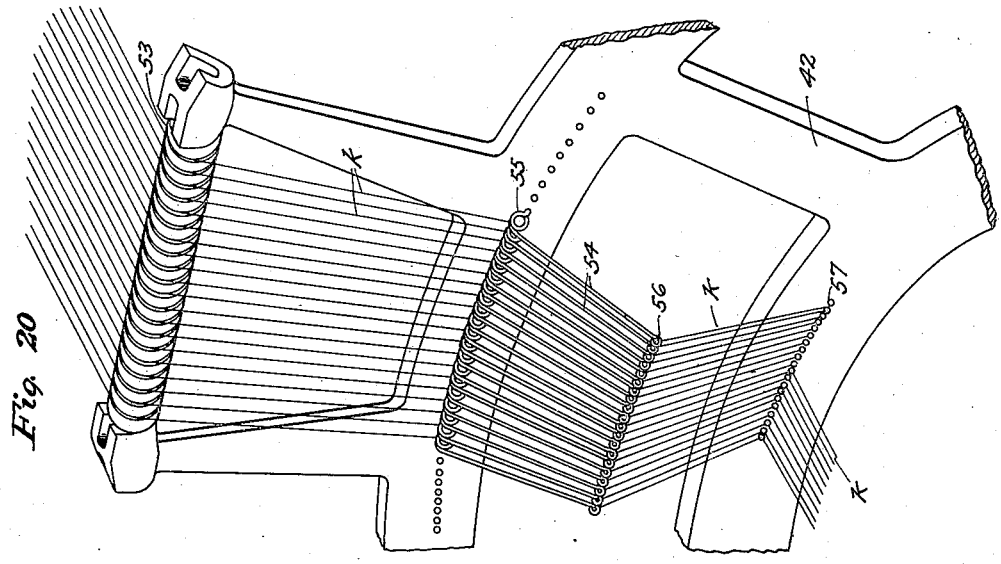
Figure 20 is a fragmentary view of certain of the parts shown in Fig. 19, but enlarged.

The strands of thread or cord $k$ from each of the spools or bobbins 46 pass first over a groove roller 47 which is mounted between rocker arms 48 carried by the spool frame rods 45 and in turn carrying beyond pivotal supports at 49 brake arms 50 which are applied to brake drums 51 upon the respective spools 46. Spring or other suitable tension devices 52 are applied to the rocker arms 48 to cause the same normally to apply, or tend to apply, the brake arms 50 to the brake drums 51. The tension of the strands $k$ over the groove rollers 47, in the grooves of which the several strands are respectively received, is in opposition to the exertion of such tension devices 52, whereby the spools or bobbins are released for free rotation as demand is made upon them to supply the strands $k$, and whereby conversely a braking action is set up as such demand decreases. From the grooved rolls 47 the strands $k$ pass forwardly to and over a roll 53 (see Fig. 20) having grooves which respectively accommodate the respective strands $k$. Upon the forward or left-hand spider 42 is mounted a series of fingers 54 (preferably formed from resilient material), ranging outwardly and downwardly. At its upper end, each finger 54 is coiled on itself to form an eye 55 the purpose of which is to give a resilient quality to such spring finger for tension purposes and to provide a guide through which one of the strands $k$ pass. The free end of the finger fits an opening in the spider, as shown in Fig. 20. The respective strands after passing through such eyes 55 pass lengthwise of such fingers and through other terminal eyes 56 and thence to and through looped wire eyes or guides 57 secured to the outer face of the spider 42, whence such strands $k$ pass convergently to the path of the first rubber sheet and the bead strands at the platen 33.

In connection with each of the drums 26 of the members $a$ and $b$ for supplying bead material strands $c$, I provide a brake arm 58 at the upper end of each of which is provided a guide sheave or pulley 59, over which the respective bead strand $c$ passes from the drive roller 37, so that the course of said strands $c$ is brought substantially into parallelism with the platen 33. This brake arm carries a brake shoe 60 which is applied to one end of the spool or drum 26. Each such brake arm is fulcrumed between its ends as at 61 and at the lower end is connected, as at 62 with an equalizer bar 63 from the central portion of which a cable or rope 64 extends to and about a floating sheave or pulley 66 which is connected with a contractile spring or other suitable tension device 67, the other end of the rope, cable or cord 64 being operatively connected with the member $z$ (Fig. 4) for controlling the degree of positiveness of rotation of the core D in accordance with the tension imposed upon the completed fabric $x$. It thus results that the braking action upon the drum 26 at the brake shoe 60 is kept in ratio with the degree of positiveness of rotation of the core D.

It will be understood that the partially completed fabric which is the product of the means A above described, may or may not include the first rubber sheet $h$, as this is optional. It may only include the bead strands $c$ and the strands $k$ wrapped about the same. And likewise the second rubber sheet $s$ may be omitted in the operation of the means B, so that the completed fabric $x$ will be merely a cord fabric having the bead strands at the sides and the cord wrappings about the same. However, under some circumstances and for some purposes and reasons, it is advantageous to incorporate both of these rubber sheets in the completed fabric, as it obviates the necessity of separately supplying rubber sheets to the core in the formation of the tire, the same being so ordinarily supplied in alternation with the cord fabric. In that connection it is to be stated that the strands $c$ and $k$ are preferably rubberized prior to their supply from the members $a$ and $b$ and $g$, so that the cord fabric itself, even without the first and second rubber sheets, partakes of a rubber character.

The feed and consolidating rolls $q$ and $r$ are formed and adapted to receive the partially completed fabric from the means A above described, and to consolidate the same together with the second rubber sheet $s$ supplied by the member $t$. To that end the roll $q$ is provided with spaced peripheral channels or grooves 68 adapted to receive the bead structures comprising the bead strands $c$. The bearings of this roll $q$ are mounted in guides at their ends and preferably adapted to be subjected to the compression of springs 69 operated upon by threaded shafts 70 mounted in the frames 71 which guide such bearings, such shafts being provided with hand wheels 72. This roll is an idler cooperating with the roll $r$ which is positively driven and is of smooth cylindrical form, acting to press the bead strand structures into the groove 68 and to consolidate the two courses or laps of cord fabric composed of the wound or wrapped strands $k$, with the first rubber sheet $h$ between such laps, and also to consolidate with such formation the second rubber sheet $s$ which is fed to the partially formed fabric at the rolls $q$ and $r$. The positively driven roll $r$ is preferably fast upon a shaft 73 the drive for which will be hereinafter described. After passing between the rolls $q$ and $r$ the consolidated and completed fabric passes about the master roller $y$. This roller is mounted at the upper end of a lever arm 74 included within the member $z$, and in a suitable yoke 75, being provided with peripheral grooves or channels 76 to receive the cord structures in the completed fabric. The lever arm 74 is substantially centrally mounted, as at 76ª, upon a rock shaft 77, and the lower end of such lever arm is connected with the cord or cable 64 which passes about the floating sheave or pulley 66, and thence about a guide pulley or sheave 78 and so on to the lower ends of the lever arms 58 for the brake shoes 60, which control the withdrawal of the bead strands $c$ from the spools or drums 26.

The core D is mounted upon a horizontal core shaft 79 by means of a suitable chuck device 80, and such shaft 79 is driven by a spur gear 81 which meshes with a pinion 82 upon a drive shaft 83. The pinion 82 is feathered or splined to the drive shaft 83 jointly with a spur gear 84, which is adapted to mesh with a spur gear 85 pinned to the core shaft 79, as at 86, the pinion 82 and gear 84 being adapted to be shifted lengthwise of the shaft 83 by a yoke 87 and a lever 88 fixed to a rock shaft 89. The lever arm 88 is controlled by a rod 90 pivoted to the same at one end and at the other end provided with a handle 91, the rod 90 being suitably guided for endwise movement. Mounted upon the rock shaft 89 is a quadrant 92 provided with a plurality of notches 93 adapted separately to co-act with a spring-pressed pin 94 which, co-acting with one of said notches yieldingly maintains the pinion 82 in mesh with the gear 81, co-acting with another of the same holds the gear 84 in mesh with the gear 85, and co-acting with an intermediate notch maintains both the pinion 83 and the gear 84 out of mesh with the respective gears mentioned. Between one face of the gear 85 and the adjacent face of the gear 81 is a friction disc 95. A collar 96 is splined upon the core shaft 79, and between one face of the same and the adjacent face of the gear 81 is provided a friction disc 97. The gear 81 is loosely mounted upon the shaft 79. Surrounding the shaft 79 is a worm gear 98 meshing with a worm 99 fast upon a shaft 100 which ranges at right angles to the shafts 79 and 83. The worm gear 98 is provided with an internal screw threaded hub 98ª which is threaded upon a boss 101 upon a frame member 102 which includes or is provided with a box or bearing 103 for one end of the core shaft 79. Disposed between one face of the gear 98 and the adjacent face of the collar 96 is an annular ball thrust bearing 104; and disposed between the boss 103 and a fixed collar 105 upon the adjacent end of the shaft 79 is an annular ball trust bearing 106. Between these thrust bearings 104 and 106 the shaft 79 is balanced against endwise movement. However, the ball thrust bearing 104 serves to transmit to the collar 96 and to the gear 81 and to the frictional discs 95 and 97 applied to the faces of said gear, variations in pressure incident to rotation of the gear 98 by the worm 99, so as to vary the positiveness with which the core shaft 79 is rotated by the drive shaft 83 through the gear 81 by the pinion 82. The shaft 100 is operated by a bevel gear 107 mounted at one end of a shaft 108 (see Fig. 7) and meshing with idle bevel gears 109 and 110 mounted upon the shaft 100 and adapted to transmit their rotation to the shaft 100, one at a time, through the agency of a friction clutch device 111 splined upon the shaft 100 and operated by a yoke 112, such yoke being actuated by a pivoted arm 113 the free end of which is connected with an arm 114 upon the rock shaft 77 by a link arm 115. Thus, as the rock shaft 77 is turned, responsive to variations in pull or tension upon the master roller $y$, the clutch device 111 will be actuated in one direction or the other, operatively coupling either the gear 109 or 110 with the shaft 100, and operatively uncoupling the other, with respect in each instance to the channel gear 107 and causing a turning movement of the shaft 100 in either one direction or the other and a similar turning of the worm 99 and the worm gear 98 to vary slightly the position of such worm gear 98 endwise of the shaft 79, so as to vary the pressure as between such worm gear 98 and the collar 96, and the resultant compression of the friction discs 95 and 97 under the resistance of the fixed gear 85, so as to exert a variant in squeeze upon the gear 81 and vary the positiveness of rotation of the core shaft 79, or, in other words, the degree of lag as between the rotation of said shaft 79 and the drive shaft 83, through the gear 81 and the pinion 82. Thus, as the pull or tension upon the completed cord and tire fabric $x$ as it passes about the master roller $y$ varies, in the building up of the tire upon the core, a proportional slippage between the shaft 79 and drive shaft 83 at the gear 81, will take place so that the feed of the completed fabric, and, in the present machine, the production of such fabric will not be subjected to disturbing pull or strain or destructive action. All this of course is rendered necessary by the fact that the peripheral area or outside diameter of the forming tire increases as lap after lap of fabric is disposed upon the core.

The positive drive of the core shaft 79 from the drive shaft 83 through the gears 84 and 85 is utilized for certain specific operations or performances in the use of the machine, as, for instance, to emplace upon the core a bead cover strip or bead envelope 116 illustrated in Figures 17 and 18 and hereinafter referred to descriptively.

Mounted upon the shaft 83 is a loosely rotating gear 117 controlled by a jaw clutch device 119 splined to the shaft 83, such gear 117 meshing with a similar spur gear 120 upon the shaft 108 which through the clutch device 111 gives turning movement to the shaft 100. Such clutch device 119 is provided with a yoke 121 (Fig. 5) which is controlled by a lever arm 122 fulcrumed as at 123, and in turn controlled by a link arm 124 having a handle 125, such link arm 124 being guided similarly to the link arm 90. Thus the gear 117 may be thrown into and out of couple with the shaft 83. The two lever arms 88 and 122 are operatively connected by a link arm 125$^a$ operatively connected as at 126 with the lever arm 88 and having a loose pin and elongated slot connection as at 129 with the lever arm 122. Thus the clutch 119 may be thrown to cause rotation of the shaft 108 at any time, save and except when the gear 84 is in mesh with the gear 85 to cause a high speed unyielding drive of the core shaft 79. At such time, the link rod 125$^a$ restrains the lever arm 122 from movement to clutch the gear 117 in connection with the shaft 83.

The members $m$ and $n$ constituting auxiliary supply means for supplying the strands or elements $p$, such as auxiliary bead material, as exemplified in Figure 17, in the form of filler strands 130 of cord or wire or other material, or interlocking tapes 131 for interposition between adjacent bead elements, comprise each a drum or spool 132 or 133 upon which such auxiliary bead material is wound, and from which it is drawn off in the rotation of the core through a perforated bracket 134 having guide eyes 135 (see Fig. 1), from which guide eyes such cords or strands or the like pass through guide eyes 136 (see Fig. 4) in an extension of such bracket 134. Thence the cords or strands or the like proceed directly to the core D. In order to oppose over-running of the drums or spools 132 and loosening or improper unwinding of the auxiliary bead material $p$ therefrom, each of such drums or spools is provided with a brake device such as a brake hub or annular flange 137 over which is passed a weighted brake band 138.

I have now described the various elements of the machine incident to the production and consolidation of bead and tire fabric and the feed of the same to the core, as well as the members by which the auxiliary bead material is supplied and directed to the core. I have also described the means by which the core is rotated, yieldingly to compensate for variations in tension upon the completed bead and tire fabric, and on the other hand the means by which the core may be positively and unyieldingly rotated. I will now describe the means by which the cord and tire fabric or the auxiliary bead material is formed into the tire upon the core. This core, as shown in the drawings and particularly in Figures 5 and 11, and 15 to 17 inclusive, will be understood to comprise a suitable core body 139 formed to produce a suitable complementary formation of the tire resultant upon the winding or wrapping of the bead and tire fabric about such core body. To accomodate the bead-forming operations of the machines I depart from the usual core organization and provide bead rings or annuli 140 one at each side of the core body members, and adjacent to the inner extremities thereof, the same being bolted to such core members, as at 141, to hold and bind together in assemblage the core members and the bead rings. These bead rings form, as it were, annular pockets extending at the inner extremities of the sides of the core, within which pockets the act of forming and consolidating the bead structures takes place, all pursuant to action of the means C for forming the tire and bead structures.

The means C include a plurality of rotatable pressure members $aa$ which are grouped generally about the path of rotation of the core D, so as to be directed toward such core and brought into operative engagement with the bead and tire fabric as the same is supplied to and wrapped about the core during the rotation of the latter. These rotatable presser members $aa$ are preferably mounted each for pneumatic projection or subject to pneumatic thrust, each being provided with or carried by a piston or plunger 142 having a working fit in a cylinder 143 which is provided at its closed end with a port 144 communicating with a continuous pressure medium passage 145 formed in the casting 146 common to all such cylinders. These are the cylinders from the open ends of which project rotatable pressure members $aa$ adapted for the rolling down of the tire fabric, and consisting of peripherally channeled rollers 147. The cylinders 143 at the extreme ends of the cylinder group contain rotatable presser members $aa$ in the nature of rollers 148, 149 and 150, respectively, shown in Figures 15, 16 and 17, and which may be channeled or convex at their peripheries in accordance with the nature of the work to be performed, in the rolling down and forming and consolidation of the bead structures, all as hereinafter defined. These end cylinders are provided each with means for supplying pressure medium, being suitably connected together by a compressed air pipe 151 which extends between bosses 152 upon such end cylinders and having ports communicating with the cylinder chambers. One of these cylinders is directly connected at its port with the pressure medium supply by a tubular connection 153. The remaining cylinders, namely, the intermediate group, the members of which are provided with the tire fabric presser members 147, are supplied with pressure medium through a tubular connection 154. A pipe 155 leads to a source of compressed air or other pressure medium and from such pipe extends the tubular connection or pipe 153. The pipe 154 communicates with the pipe 153 through a three-way valve 156 whereby the intermediate cylinders 143 may be supplied with pressure medium, or such supply may be terminated, or the intermediate cylinders may be bled of the pressure medium to render their presser members aa ineffective.

In each of the cylinders 143 is provided a retraction spring 157, namely, a contractile coil spring secured at one end as at 158 to the closed end of the cylinder, and at the other end as at 159 to the piston or plunger. Each piston is suitably packed as at 160 to render it leak-proof as to the pressure medium.

When the pressure medium is admitted to the cylinders 143, the presser members aa are brought to bear upon the tire fabric and bead structure to cause the rolling down of these parts upon the core with the bead structure in helical arrangement, side by side, in engagement with the bead rings 140. By controlling the valve 156, certain of the presser members can be operated independently of the remaining members.

The end cylinders 143, one of which, at the right, is shown removed in Figure 11, are provided each with extended side flanges 162 within which are formed curved slots 163 receiving the shanks of bolts 164 the heads of which are confined for adjustment lengthwise within ways 165 forming bosses 166 preferably integral with the main casting 146 of the intermediate cylinders 143. Nuts 167 applied to the bolts 164 serve to hold the cylinders and their flanges in position resultant upon adjustment lengthwise of the ways 165, and resultant upon adjustment permitted by the curved formation of the slots 163. Thus the cylinders 143 of the bead-forming presser members aa may be adjusted substantially radially of the core, the ways 165 extending substantially parallel with the plane of the core, and may also be adjusted so as to vary the angle of presentation of such presser members to the core and the bead material supplied thereto.

bb designates a member for varying the normal positions of the presser members aa with respect to the core, and radially with respect to the center of the core or the chuck that carries the same, so as to position such bead and tire-forming means C in entirety for proper working relation with respect to whatever diameter of core may be employed, such diameters varying of course in connection with different sizes of tires. Such member comprises spaced arcuate ways 168 and 169 within which is mounted a slide or carriage 170 which constitutes the terminal portion of a boss 171 which is an extension of the main casting 146 which carries the intermediate cylinders 143. Thus all of the cylinders 143 are ultimately carried by such boss 171 and the slide 170. Journaled in the bosses 166 and the slide 170 is a rock shaft 172 upon which is mounted an angular finger 173 bearing against and stopping one end of a coil spring 174 which is wound about a hub 175 loosely surrounding the shaft 172 and provided with spaced arms or brackets 176 carrying a grooved roller 177 which bears upon the fabric of the forming tire as it is wound about and upon the core D. One end of the rock shaft 172 carries a forked finger 178 which straddles a locking pin 179 mounted within a chamber in the slide 170, and guided at its ends in the walls of said slide 170, being adapted to project at one end beyond such slide and into one of a plurality of recesses 180 formed in the way 168.

Mounted upon the locking pin 179 is a head or stop 181 against which the finger 178 bears. It will be obvious that movement of the roller 177 outwardly and radially of the core D will exert a greater stress upon the spring 174 and cause a tendency of the shaft 172 to turn, so that when the slide 170 is sufficiently advanced within the ways 168 and 169, such locking pin at its end will enter the next recess 180 in its path. By the term "advanced" I mean a movement of the slide in a generally downward direction, or to the left of the showing in Figure 4, and it is to be remarked that the curved ways 168 and 169 lie in concentric arcs the center of which is eccentric to the axis of rotation of the core. This arrangement of slide 170 and ways therefor, as provided, and is properly calculated, so that whatever the diameter of the core may be, the rotatable presser members aa are always brought into operative pressure upon the bead and tire fabric at the point at which the same is tangent with or first engages with the surface of the core.

The means C further include a member cc which serves to adjust the group of cylinders 143 and their connected parts and the slide 170 upon which they are mounted. This member comprises in the main a double-acting cylinder 182 supported for oscillation in a vertical plane midway of its ends in a yoke 183, and is provided with the usual piston and a piston rod 184ª (see Fig. 14). The cylinder is adapted to receive pressure medium at both ends, at one end at a time, through passages 184, 185 extending from a connection nipple 186 substantially centrally of the cylinder and ranging lengthwise thereof in opposite directions. With this nipple and its separate connections with the said passages are connected respectively a flexible pipe 187 extending from the passage 184 to the pipe 153 between the valve 156 and the valve 161, and the flexible pipe 188 extending to the valve 161 at the side thereof opposite to the pipe 153. The valve 161 is a four-way valve permitting the pipe 188 and its respective end of the cylinder to be either supplied with pressure medium or bled, and likewise permitting the pipe 153 to either be supplied with pressure medium or bled, including the pipe 154, so that all of the cylinders 143 under control of the valve 161, as a master valve, may be either supplied with pressure medium or bled. In order to actuate the slide 170 and unlock the same, if locked, I provide the slide with a suitably guided link rod 189 which is pivotally connected at one end with the piston rod 184ª, as at 190, and at the other end, as at 191, with one member of a bell crank lever 192 fulcrumed with the interior chamber in the slide, as at 193, such bell crank lever in its other member being yoked as at 194 to straddle the locking pin 179, upon which is provided a head or stop 195, the finger 178 and such last named member of the bell crank lever 192 being both disposed between the heads or stops 181 and 195 within the angle of such bell crank lever, and so disposed as to permit a limited rocking of the latter, is a stop 196. The operation of the member cc and its connections is as follows: The battery of cylinders 143 is normally in its extreme position with respect to distance from the axis of rotation of the core D. In that position it is maintained by pressure medium in the remote end of the cylinder 182, the locking pin 179 not then being in locking position. After a proper core has been fitted to the chuck 80 upon the shaft 79, the valve 161 is manipulated to bleed the remote end of the cylinder 182, and to admit pressure to the pipe 153. Pressure is thus admitted to the adjacent end of the cylinder 182 and the piston is moved so as to cause the piston rod 184ª to be retracted in the cylinder which slightly rocks the bell crank lever 192 until the stop 196 is encountered. Thereupon the slide 170 will be actuated in a downwardly curved path and this will continue until the roller 177 is brought to bear upon the core, whereupon the spring 174 will be put under further stress and tendency exerted thereby to rock the shaft 172 through the finger 173. However, this rocking cannot take place until the locking pin 179 has come into registration with the next adjacent recess 180. Thereupon the locking pin 179 is shot home in such recess by the potential of the spring 174 and further downward movement of the slide 170 is prevented and the slide is positively retained in the position in which it is so locked. At this moment a building up of pressure in the bead-forming presser members *aa* takes place and the same are brought into operative position to bear upon the bead structure. Likewise, if the three-way valve 156 is in the position shown in Figure 4 pressure is exerted in the intermediate cylinders 143 for bringing the main tire-forming presser members *aa* into operative relation with respect to the core. The means C is now in position to operate. The pressure is allowed to remain in the adjacent end of the cylinder 182 exerting a pull upon the piston rod 184ª. In adjusting the cylinders 143 and their connections upwardly by moving the slide 170, preparatory to restoring the cylinders and slide to their outermost position prior to again adjusting them inwardly and downwardly to adapt them and position them properly for a core of different size, or in substituting a core of the same size, the valve 161 is manipulated to bleed the adjacent end of the cylinder 182, and, the valve 156 being in the position shown in the drawing, to bleed all of the cylinders 143. This likewise admits air to the remote end of the cylinder 182, moving the piston thereof so as to cause its rod 184ª to advance the slide 170 and the attaching cylinders 143 and parts, to the uppermost and outermost positions stated. The first phase of this movement of the piston, however, will cause a rocking of the bell crank lever 192 so as to move the locking pin 179 into unlocked condition, whereupon the movement of the slide last described follows. The parts are now maintained in the position first described, the slide being unlocked and ready for its downward and inward movement which is effected as above set forth.

In order to drive the shuttle and revolve its several parts about the central support 1, I preferably provide a sprocket wheel 197 upon the spider 44, about which a sprocket wheel 198 upon a counter-shaft 199, is trained a sprocket chain 200. The shaft 199 is provided with a further sprocket wheel 201 (see Fig. 6). Upon the hub of the bevel gear 110 is mounted a sprocket wheel 202, and about this and the sprocket wheel 201 is trained a sprocket chain 203. It results that whenever the shaft 108 is rotated, rotating the bevel gear 107 and bevel gear 110, the shaft 199 will be rotated, and, through the train of parts last mentioned, the shuttle element as an entirety will be rotated about its support 1 and the strands $k$ of thread or cord will be wrapped and wound about the material advanced over the platen 33.

The shaft 83 is provided at one end with a spur gear 204 which meshes with a pinion 205 upon a stub shaft 206 carrying a spur gear 207 in turn meshing with a pinion 208 upon the armature shaft of an electric motor 209, which operates as prime mover for the machine. The feed roll $r$ is fixed upon the shaft 73, suitably journaled at 211 in an extension 210 of the frame 71 which supports the journals of the roll $q$, and mounted upon this shaft are a plurality of fixed change speed gears 212 which are adapted respectively to mesh with a transmission gear 213 carried upon a stub shaft at one side of an arm 214 the inner end of which embraces loosely at 215 the extended hub 216 of a pinion 217, which hub and pinion are splined upon the shaft 108. The outer end of the arm 214 is provided with a hand-hold 218 upon a spring-retracted locking pin 219 which is adapted to take into either one of a plurality of openings 220 each arranged adjacent to a shoulder 221, a plurality of which are arranged in stepped relation to the upper edge of a slot 222 formed in a casing 223 which encloses the gears 212. When the gear 213 is brought into mesh with any one of the change speed gears 212, the locking pin is permitted to enter the respective hole 220, whereupon power will be transmitted from the shaft 108 through the pinion 217 and the gear 213 to such gear 212 to cause the shaft 210 of the feed roll $r$ to be rotated at a speed proper for the formation of the tire upon the core, when considerations of width of tire, nature of tire fabric employed, and the like, are taken into account. The hub 216 is readily adjusted along the shaft 108 to which it is splined, together with the gear 217, by manipulating the arm 214. The gear 213 at all times maintains a planetary relation to the gear 217 so that it is always prepared to transmit motion to whichever of the gears 212 is selected in the change of speed. The shaft 73 is further journaled, as at 224 and 225, at either side of the change speed gears 212.

The operation, method of use and advantages of the improved machine for making tire fabric and tires will be readily understood from the foregoing description, taken in conjunction with the accompanying drawings, and the following statement:

With the parts in the positions shown in the drawings, the feed and consolidating rolls $q$ and $r$ are operating to draw to themselves the partially completed bead and tire fabric consisting of the bead strands $c$, the first rubber sheet $h$, and the wrapped strands $k$. This partially completed fabric is formed by the means A, the bead material $c$ being supplied at the edges of the platen 33 in the channels 38 in the edges thereof and the first rubber sheet $h$ being fed over its muslin conveyer $f$, and the shuttle member $g$ winding and wrapping the material or strands $k$ around such other elements so that the partially completed fabric is continuously produced. When the partially completed fabric is drawn to the feed and consolidating rolls $q$ and $r$ it receives the second rubber sheet $s$, and said rolls press together and complete and consolidate the bead and tire fabric into its final organization as the fabric $x$, so that it is drawn over the master roller $y$, in the rotation of the core D and is formed into the tire under the action of the means C, which comprise the cylinders 143 and the rotatable presser members $aa$ as associated therewith and operated by the pressure medium admitted to such cylinders. As the tension of the completed fabric $x$ in its passage about the master roller $y$ varies, the member $z$ is brought into play and the rock shaft 77 given a turning movement to cause the clutch device 111 to clutch to the shaft 100 either the bevel gear 109 or 110 and give a turning movement to such shaft 100, which in turn causes the worm gear 98 to be turned in one direction or the other and either increase or diminish the squeeze upon the spur gear 81 to vary the positiveness with which the same rotates the shaft 79 and the core D. The spring 67 acts in opposition to the increased tension of the completed fabric upon the master roller $y$. The spring 67 acts in opposition to the tension of the bead strands $c$ upon the sheaves 59. The brake shoes 60 upon such levers 58 thus are varied in their effectiveness in accordance with the demands for supply of bead material from the drums or spools 26. The muslin spacer fabric $f$ is returned after its traverse of the platen 33 and wound upon the drum 31 in step with the withdrawal of bead material $c$ from the drums 26, due to the drive of the rollers 35 and 36 positively, by the roller 37. The speed at which the feed or consolidating rolls $q$ and $r$ are rotated is determined by the change speed mechanism including the change speed gears 212 and the gear 213 which transmits power from the shaft 108 to the selected change speed gear.

When the fabric is led to the core D, and the means C has been adjusted so as to properly position the various rotatable presser members $aa$ with respect to the diameter of core D to be employed in the process of forming the tire, by means of the slide 170, and the cylinder 182 and its piston and piston rod 184ª and the associated parts and features, compressed air is under admission to the cylinders 143, and both the intermediate presser members $aa$ which act upon the main portion of the tire fabric and the outside presser members *aa* which act upon the bead structures, are urged against the core or the fabric thereon in the proper working relations. However, if certain auxiliary bead material *p* is to be first applied to the core and the bead rings 140 thereon, the presser members *aa* of the intermediate cylinders 143 are rendered ineffective by cutting off the pressure medium from their cylinders at the three-way valve 156. As the core is rotated, with varying positiveness responsive to varying tension produced by the increasing thickness of the tire upon the core, under control of the member *z* as above set forth, the main portion of the tire fabric is rolled down onto the core and consolidated by the presser members *aa* of the intermediate cylinders 143, and the bead structures, such as the bead material *c*, within a cord wrapping is consolidated and formed in the pocket at the juncture of the body 139 of the core and the bead rings 140 thereof. This operation is continued until the completely formed tire body is developed, and is ready for addition of the rubber elements and final vulcanization.

The tire unit so formed is now ready to be removed with its core for completion of the tire, and just prior to the application of the last portion of the bead and tire fabric such fabric *x* is severed to produce a terminal end portion which is formed and rolled down by the means C. Now, the valve 161 is operated to bleed what we have called the adjacent end of the cylinder 182 and at the same time compressed air is admitted to the remote end of said cylinder, and this movement of the valve likewise bleeds the cylinders 143, and the presser members *aa* are now adjusted away from the core and the tire unit thereon, by movement of the slide 170 in upward and outward direction where it is held by the pressure in the remote end of the cylinder. This leaves the core and the tire element thereon free to be withdrawn from the chuck 80 upon the core shaft 79, and thereupon a fresh core is substituted and the procedure is as recited.

In Figures 15, 16 and 17 are shown modified forms of presser members, namely, 148, 149, and 150, the same being members for forming and consolidating the bead structure. The roller 148 is channeled or concave in its periphery, as at 148$^a$, and designed to act upon the feed structure as produced from bead material of the nature disclosed in the foregoing description and in the drawings. This form of bead is adapted for use in connection with quick detachable or clincher tires, and the bead structure is formed and consolidated in the pocket between the core body 139 and bead ring 140. In Figure 16 is disclosed a straight side tire in which the periphery 149$^a$ of the roller 149 is convex, and the bead structure is flattened out in the pocket, to produce the straight side formation. In Figure 17 I disclose filler material 130 which is supplied as auxiliary bead material *p*, from the members *m* and *n*. This material and the complete bead structure is formed within a bead or jacket envelope or cover strip shown at 116 in conjunction with a straight side tire bead structure in Figure 18, and likewise shown in Figure 17. In this envelope material 116, a broad strip of textile material suitably rubberized, is fed by hand to the core, which core is for this purpose operated at a relatively higher speed under drive of the gear 85 upon the core shaft 79 through the gear 84 upon the shaft 83, pursuant to suitable adjustment of the gears 82 and 84. In Figure 17 also are shown metallic strands or cables 130$^a$ which are incorporated in the fabric in the normal operation of the machine, such strands or cables taking the place of the textile cords or strands *c* and being fed from drums or spools such as 26. Also I show the interlocking tapes or strips 131 above referred to which are constituted of the same material as the filler material 130, which latter constitutes folded and compressed tapes or strips such as 131. These inter-locking strips 131 are fed from the auxiliary feed members *m* and *n* in alternation with the courses of tire and bead fabric, the operation being simultaneous with the operation of the feed of the main tire and bead fabric, there being thus a double feed forming this alternating lower construction. This bead structure is rolled down by the roll 150 having a concave portion 150$^a$ which operates at the zone of the cables or strands 130$^a$ and the portion 150$^b$ which operates at the portions of the bead structure just above such strands or cables. The slight rib remaining upon the side of the bead structure after its formation, in the zone of the cables or strands 130$^a$ is pressed flat or reduced by the side plates used in connection with the vulcanizing mold. After the bead structure has been completed, for example, as shown in Figure 17, the jacket or covering strip or envelope strip 116 is brought up about the bead structure at the outside and rolled down upon the same, completely jacketing the bead structure.

The springs 52 exerting their tension upon the arms 48 carrying the grooved rolls 47 over which the strands *k* pass from the several spools 46 of the shuttle member *g* to the grooved roller 53 and over the same to the guide and tension devices through which or in connection with which such strands pass to the zone at which they are wrapped about the tire bead material *c* and tire material *h*, are of a predetermined tension which is substantially that of the average tension to which the spring fingers 54 are subjected in the operation of the shuttle member. This of course relates only to the spring fingers 54 which are acted upon by the strands k taken from the respective spool 46 of the respective roller 47 acted upon by the respective springs 52. Thus, when the tension upon the respective group of spring fingers 54 falls beneath the average potential of tension, the springs 52 become effective and the brake members 50 are operatively applied to the brake drums 51 to check the rate of rotation of such spools. This action, in prolonged operation of the machine, resolves itself to a balanced condition as between the action of the spring fingers 54 and of the springs 52, so that the proper normal frictional effect of the brake members 50 upon the drums 51 is maintained.

It will be manifest that many variations and modifications may be made with respect to the structure of tires formed upon a machine embodying the invention, and with respect to the bead and tire fabric produced by such machine, all with respect to the organization and construction hereinabove described and shown in the drawings, and all of which veriations and modifications will well come within the invention and the true spirit and interpretation thereof, the present invention not being limited in its broad and fundamental aspects to any details of construction, inter-relation, combination, and particular operation of parts, members and features.

Having thus disclosed my invention, I claim and desire to secure by Letters Patent:

1. In a machine of the character disclosed, means for supplying tire material, a core upon which the tire is to be formed of such material, means for rotating the core, and means upon which the tire material supplied to said core exerts a tension, whereby the means for rotating said core is varied as to positiveness of its action.

2. In a machine of the character disclosed, a core, means for forming a tire upon the core, means for feeding tire material to the core, a core shaft, a gear loosely mounted upon said shaft, means for rotating said gear, and means for varying the positiveness of couple of said gear with said shaft responsive to variation of tension upon the material fed to said core.

3. In a machine of the character disclosed, a core, means for forming a tire upon the core, means for feeding tire material to the core, a core shaft, a gear loosely mounted upon the core shaft, means for rotating said gear, and means for varying the positiveness of couple of said gear with said core shaft responsive to variation of tension upon the material fed to said core; said last named means comprising a movable member provided with a roller over which said tire material passes, a drive shaft, a driven shaft, an element upon said core shaft for directly acting upon said gear upon said core shaft, and a clutch device between said drive shaft and said driven shaft, said clutch device being operated by the movement of said movable member.

4. In a machine of the character disclosed, a core, means for forming a tire upon the core, means for feeding tire material to the core, a core shaft, a gear loosely mounted upon the core shaft, means for rotating said gear, and means for varying the positiveness of couple of said gear with said core shaft responsive to variation of tension upon the material fed to said core; said last named means comprising a movable member provided with a roller over which said tire material passes, a drive shaft, a driven shaft, an element upon said core shaft for directly acting upon said gear upon said core shaft, and a clutch device between said drive shaft and said driven shaft, operated by the movement of said movable member, said element upon said core shaft being mounted for movement lengthwise of said core shaft responsive to turning action of said driven shaft.

5. In a machine of the character disclosed, a core upon which a tire is to be formed, a core shaft, means for driving said core shaft subject to variation in positiveness of drive, means for driving said core shaft without variation in positiveness, and means for substituting either of said drive means for the other of said drive means in operative couple with said core shaft.

6. In a machine of the character disclosed, a core upon which a tire is to be formed, a core shaft, means for driving said core shaft subject to variation in positiveness of drive, means for driving said core shaft without variation in positiveness, means for substituting either of said drive means for the other of said drive means in operative couple with said core shaft; in combination with means for supplying tire material to said core; said latter means being inter-related with said means for drive substitution of said core shaft, whereby said means for supplying tire material are incapable of operation during drive of said core shaft without variation in positiveness.

7. In a machine of the character disclosed, a core upon which a tire is to be formed, means for rotating said core, means for supplying tire material to said core, tire-forming means applicable to said core and the material supplied thereto and means for automatically adjusting said tire-forming means relative to the center of rotation of said core, whereby said tire-forming means may be accommodated to cores of varying diameter.

8. In a machine of the character disclosed, a core upon which a tire is to be formed, means for rotating said core, means for supplying tire material to said core, tire-forming means applicable to said core and the material supplied thereto and means for adjusting said tire-forming means relative to the center of rotation of said core, whereby said tire-forming means may be accommodated to cores of varying diameter and said tire-forming means invariably applied to said core at the zone of first contact with said core of the tire material.

9. In a machine of the character disclosed, a core upon which a tire is to be formed, means for forming a tire upon such core, and means for adjusting said tire-forming means to accommodate the same to cores of varying diameter; said last named means comprising a carriage for said tire-forming means, means for operating said carriage, and means responsive to contact with such core for controlling said operating means, whereby said carriage is locked in position of proper adjustment.

10. In a machine of the character disclosed, a core upon which a tire is to be formed, means for forming a tire upon such core, means for adjusting said tire-forming means to accommodate the same to cores of varying diameter; said last named means comprising a carriage for said tire-forming means, means for operating said carriage, and means responsive to contact with such core for controlling said operating means, whereby said carriage is locked in position of proper adjustment; and means for unlocking said carriage to release the same for movement in one direction.

11. In a machine of the character disclosed, a core upon which a tire is to be formed, means for forming a tire upon such core, and means for adjusting said tire-forming means to accommodate the same to cores of varying diameter; said last named means comprising a carriage for said tire-forming means, means for operating said carriage, and means responsive to contact with such core for controlling said operating means, whereby said carriage is locked in position of proper adjustment; said last named means comprising a freely mounted roller adapted to contact with the core, a rock shaft, a locking member carried by the carriage, and tension means effective upon the shaft to tend to turn the same and the potential of which is varied in the bodily movement of said roller.

12. In a machine of the character disclosed, a core upon which a tire is to be formed, means for forming a tire upon such core, means for adjusting said tire-forming means to accommodate the same to cores of varying diameter; said last named means comprising a carriage for said tire-forming means, means for operating said carriage, and means responsive to contact with such core for controlling said operating means, whereby said carriage is locked in position of proper adjustment; and means for unlocking said carriage to release the same for movement in one direction; said last named means including a member which acts to move said carriage after first unlocking the same.

13. In a machine of the character disclosed, a core upon which a tire is to be formed, means for forming a tire upon such core, means for adjusting said tire-forming means to accomodate the same to cores of varying diameter; said last named means comprising a carriage for said tire-forming means, means for operating said carriage, and means responsive to contact with such core for controlling said operating means whereby said carriage is locked in position of proper adjustment; and means for unlocking said carriage to release the same for movement in one direction; said last named means including a member which acts to move said carriage after first unlocking the same; said carriage being provided with a locking member, and said member which acts to move said carriage being provided with a bell crank operating upon said locking member; said carriage being provided with a stop which permits limited movement of said bell crank in both directions.

14. In a machine of the character disclosed, a core upon which a tire is to be formed, means for supplying tire material to said core, means for forming a tire upon said core, and means for adjusting said tire-forming means in a curved path eccentric to the center of rotation of said core.

15. In a machine of the character disclosed, a core upon which a tire is to be formed, means for supplying tire material to said core, and tire-forming means applicable to said material at said core and comprising a plurality of cylinders, presser members mounted for projection from said cylinders, pneumatic means for moving said presser members, and means acting upon said presser means and opposing the action of said pneumatic means.

16. In a machine of the character disclosed, a core upon which a tire is to be formed, means for supplying tire material to said core, and means for forming a tire upon said core; said forming means comprising a presser member for forming the main portion of the tire, and a presser member for forming the bead portion of the tire; said latter presser member being adjustable with respect to its position of presentation to said core.

17. In apparatus of the class described, the combination of a plurality of sources of supply of spaced bead material, sheet material and cord material, mechanism for associating the bead material, sheet material and cord material to permit their consolidation, said mechanism including means for wrapping the cord material about the spaced bead material, means for consolidating the associated materials into a unitary web, a rotatable device to which the web is delivered, and means engaging the web to wind it on said device as the latter rotates.

18. In apparatus of the class described, the combination of a plurality of sources of supply of spaced bead material, sheet material and cord material, the sheet material being supplied between and in line with the spaced bead material, mechanism for associating the materials for consolidation, said mechanism including means for helically wrapping the cord material around the spaced bead material, means for consolidating the arranged materials into a unitary web, a rotatable device on which the web is wound, and means engaging the web and co-acting with said device to wind the web thereon as it rotates.

19. In a machine of the character disclosed, means for producing tire material, a core upon which a tire is to be formed, means for feeding the tire material to the core; means for operating said tire material producing means and said feeding means, and means for varying the speed of one of said means.

20. In apparatus of the class described, the combination of a source of supply for tire forming materials, one of said sources being arranged to deliver the material therefrom at an angle to the delivery of material from another source of supply, means for consolidating the materials into a unitary web, a device on which the web is wound, and means for driving said device, said driving means including elements which permit relative movement between them while transmitting power to drive said device.

21. In apparatus of the class described, the combination of a source of supply for tire forming materials, one of said sources being arranged to deliver the material therefrom at an angle to the delivery of material from another source of supply, means for consolidating the materials into a unitary web, a device on which the web is wound, means for driving said device, said driving means including elements which permit relative movement between them while transmitting power to drive said device, and means for controlling said relatively movable elements.

22. In apparatus of the class described, the combination of a core, means for operating said core, means for supplying tire material to said core, a movable device arranged to be engaged by the tire material supplied to said core and operated by the tension exerted by the core thereon, and tension means controlled by said movable device for regulating the supply of the material.

23. In apparatus of the class described, the combination of a core, variable means for operating said core, means for supplying tire material to said core, a movable device arranged to be engaged by the tire material supplied to said core and operated by the tension exerted by the core thereon, and connections between said movable device and said variable core operating means for controlling the latter.

24. In apparatus of the class described, the combination of a core, variable means for operating said core, means for supplying tire material to said core, a movable device arranged to be engaged by the tire material supplied to said core and operated by the tension exerted by the core thereon, connections between said movable device and said variable core operating means for controlling the latter, and separate means for operating said core.

25. In apparatus of the class described, the combination of a core, variable means for operating said core, means for supplying tire material to said core, a movable device arranged to be engaged by the tire material supplied to said core and operated by the tension exerted by the core thereon, tension means controlled by said movable device for regulating the supply of the material, and connections between said movable device and said variable core operating means for controlling the latter.

26. In a machine of the class described, the combination of a core, means for supplying tire material to said core, means for rotating said core, said means including a connection or couple, and means for varying the positiveness of said connection or couple responsive to variation in tension upon the material supplied to said core.

27. In a machine of the class described, the combination of a core, means for rotating said core, means for supplying material to said core, adjustably supported tire forming means, an element arranged to engage the tire material on said core, and means controlled by the engagement of said element with the tire material for locking the tire forming means in operative relation to said core.

28. In a machine of the class described, the combination of a core, means for rotating said core, means for supplying material to said core, movably supported tire forming means, an element arranged to engage the tire material on said core, means for moving said tire forming means toward and from said core, and means controlled by the engagement of said element with the tire material for locking the tire forming means in operative relation to said core when moved toward it.

29. In a machine of the class described, the combination of a core, means for rotating said core, means for supplying material to said core, movably supported tire forming means, an element arranged to engage the tire material on said core, means for moving said tire forming means toward and from said core, and means controlled by the engagement of said element with the tire material for locking the tire forming means in operative relation to said core when moved toward it, said means operating to release said lock when the tire forming means is moved away from said core.

30. In a machine of the class described, the combination of a core, variable means for rotating said core, means for supplying tire material to said core, and mechanism for controlling said rotating means, said mechanism including a swingable member acted upon by a spring and an element engaged by the tire material as it is supplied to said core, whereby tension exerted on it in opposition to said spring controls said rotating means.

31. In a machine of the class described, the combination of a core, means for forming a tire on said core, means for feeding tire material to said core, and means for rotating said core, said rotating means including a shaft and a gear loosely mounted on said shaft, and means for varying the positiveness of couple of said gear with said shaft responsive to variation in tension upon the material fed to said core.

32. In a machine of the class described, the combination of a core upon which a tire is to be formed, means for supplying tire body and bead materials to said core, and means for forming the tire on said core, said means comprising sets of cylinders, each having a presser member mounted for projection from one end of the cylinder, means for moving said presser members of each set of cylinders in one direction, and means acting upon said presser members and opposing the action of said moving means.

33. The herein disclosed process which consists in simultaneously supplying and associating a plurality of materials to form a web, then in feeding the web to a core and supplying with and at both edges of the web auxiliary material, and finally in rotating said core to wind the web thereon in superposed layers and applying the auxiliary material at the side edges of the web.

34. The herein disclosed process which consists in associating and consolidating a plurality of materials into a unitary beaded web, then feeding to a core said web and spaced auxiliary material disposed at the opposite side edges of the web, and finally rotating said core, compressing the beads and intermediate portions of the web thereon and applying the auxiliary material.

35. The herein disclosed process which consists in continuously supplying and associating a plurality of materials to form a web, then in feeding the web to a core, then in rotating said core to wind the web thereon in superposed layers, and finally while the core is rotating in feeding auxiliary material to the side edges of the wound material and compressing the same therearound.

36. The herein disclosed process which consists in continuously supplying and associating a plurality of materials to form a beaded web, then in feeding the web to a core, then in rotating said core to wind the web thereon in superposed layers, and finally while the core is rotating in feeding auxiliary material to the side edges of the wound material and compressing the same around the beaded portions thereof.

37. In a machine of the class described, the combination with a frame, of a forming member rotatably mounted thereon, means for rotating said member, means for supplying tire material to be wound on said member, mechanism for holding down portions of the tire material on said member, said mechanism being mounted to move relative to the axis of said member to permit its accommodation to members of different diameters with said mechanism invariably at substantially the zone of first contact of the material with said core.

38. In a machine of the character described, the combination of a device upon which a tire carcass is to be formed, means for supplying tire material to said device, means for rotating said device to wind the material thereon, means engaging portions of the material as it winds on said device to roll it into engagement therewith, and means for supporting said engaging means to move in a curved path eccentric to the axis of rotation of said device.

39. In a machine of the character described, means for supplying tire bead material in spaced strands, means for wrapping further tire material about said spaced strands, to form a web of material having beads along its opposite edges, means for compressing the material between the beads, a core upon which the tire is to be formed, said core having undercut portions, means for feeding such web to said core, and devices acting on the beads of the web inwardly at substantially right angles to the plane of the core toward its sides to roll the beads into said undercut portions.

40. In a machine of the character disclosed, means for supplying tire bead material in spaced strands, means for wrapping further tire material about the spaced strands to form a composite web of material having beads along its opposite edges, a core upon which a tire is to be formed, means for positioning the web upon the core as it is delivered thereto with the beads at opposite sides of the core, means for rotating said core, whereby the web is wound thereon, means disposed at opposite sides of the core and movable inwardly toward its sides to roll the beads thereagainst, and separate means yieldingly engaging the portion of the web intermediate the beads to roll such portion into engagement with the core.

41. In a machine of the character disclosed, the combination of a core provided at its opposite sides with detachable laterally projecting rings adjacent to which and in the annular pockets between said rings and the core the tire beads are to be formed, means for feeding a web of tire material having beads along its opposite edges to said core, said feeding means operating to deliver the beads of the material tangentially to said rings, means for forming a tire upon said core with its beads in the annular pockets in side by side relation on said rings, and means for detachably securing the said bead rings to said core.

42. In a machine of the character disclosed, the combination of a core provided at its opposite sides with detachable laterally projecting rings adjacent to which and in the annular pockets between said rings and the core the tire beads are to be formed, means for feeding a web of tire material having beads along its opposite edges to said core, said feeding means operating to deliver the beads of the material tangentially to said rings, means for forming a tire upon said core with its beads in the annular pockets in side by side relation on said rings, and means for detachably securing the said bead rings to said core, said tire forming means comprising separate members for rolling down the tire beads and the tire portion intermediate thereof.

43. In apparatus of the class described, the combination of means for supplying spaced bead material, a spool revoluble around the spaced bead material for supplying tire material thereto, a device having undercut portions on which the associated materials are wound in superposed layers, means for feeding the bead material forwardly and for revolving said spool, means for positioning the associated materials upon said device, means for rotating said device, and spaced pressure applying means yieldingly operating inwardly at substantially right angles to the plane of the core upon the opposite longitudinal edges of the associated materials as they wind on said device to roll the edges into said undercut portions.

44. In apparatus of the class described, the combination of means for supplying spaced bead material, a spool revoluble around the spaced bead material for supplying tire material thereto, a device having undercut portions on which the associated materials are wound in superposed layers, means for feeding the bead material forwardly and for revolving said spool, means for positioning the associated materials upon said device, means for rotating said device, spaced pressure applying means yieldingly operating inwardly upon the opposite longitudinal edges of the associated materials as they wind on said device to roll the edges into said undercut portions, and separate means for applying pressure to the materials between said spaced means as the materials wind on said device.

45. In apparatus of the class described, the combination of means for supplying spaced bead material, means revoluble around the spaced bead material for supplying tire material thereto, means for consolidating the bead and tire materials into a unitary beaded web, a device on which the web is wound in superposed layers with the beads in helical arrangement, means for revolving said tire material supplying means, means for positioning the web upon said device as it is delivered thereto, means for rotating said device, and means for yieldingly applying pressure to the beads in a direction inwardly substantially at right angles to the plane of the device to roll the beads against the sides thereof during its rotation and co-operating with said positioning means during winding of the web on said device.

46. In apparatus of the class described, the combination of a core, means for supplying to said core in a continuous length a web having beads along its opposite edges and positioning them thereon, means for rotating said core in co-operation with said supply means to wind the web thereon with its beads under tension in side by side relation until the desired number of plies are applied to said core, and yieldingly actuated means acting inwardly toward the sides of said core on said beads throughout their length while the web is being wound thereon.

47. In apparatus of the class described, the combination of a plurality of sources of tire material supply, one of which delivers the material therefrom at an angle to the delivery of material by another source of supply, a rotatable core, means disposed in front of said core for consolidating the materials into a unitary web for winding on said core, means for positioning the web on said core while it is being delivered thereto, and devices co-acting with the walls of said core and engaging the side edges and intermediate portions of the web to stretch the latter and tension the materials of the web during winding thereof on said core.

48. The herein disclosed process which consists in continuously supplying and associating a plurality of materials, then in consolidating the associated materials into a substantially integral structure, then in feeding the consolidated structure to a core and positioning it thereon, then in rotating the core to wind the structure thereon in superposed layers, and finally in applying pressure inwardly toward the sides of the core in a direction at substantially right angles to its plane to roll the opposite side edges of the integral structure in side by side relation against the sides of the core.

49. The herein disclosed process which consists of simultaneously supplying bead material in spaced parts and in helically winding around the spaced parts cord material, then in consolidating the associated materials into a unitary beaded web, then in feeding the web to a core and positioning it thereon, and finally in rotating said core and yieldingly applying pressure to the intermediate portions of the web thereon and the beads inwardly against the sides of the core to roll the beads in side by side relation.

50. In a machine of the character described, the combination of mechanism for producing a beaded tire material, a member upon which a tire carcass is to be wound, means for feeding the tire material to said member, means for rotating said member, and means for varying the application of power to one of said means, whereby the beads of the tire material are maintained under tension as it is fed to said member.

51. In a machine of the character described, the combination of a rotatable member having undercut sides and bead rings adjacent thereto, mechanism for supplying and feeding a beaded web to said member with the beads in tangential relation to said rings and positioning the web thereon, means for rotating said member, means disposed at opposite sides of said member and acting inwardly in a direction at substantially right angles to the plane of said member to roll the beads of the web against the undercut sides thereof during its rotation with the beads in helical arrangement side by side on said rings.

52. In a machine of the character described, the combination of mechanism for producing a composite web containing all of the materials entering into a tire carcass including beads incorporated within and along its opposite side edges, a member upon which a tire carcass is to be wound, means for feeding the beaded web to said member and positioning it thereon, means for rotating said member, and sets of devices engaging respectively the body portion and beaded portions of the web, said sets of devices being mounted to move bodily one relative to the other.

53. In an apparatus of the character described, the combination of a rotatable member, mechanism for supplying and feeding a beaded web of tire material to said member, means for rotating said member to convolutely wind the web thereon, said rotating means including friction driving elements to permit slippage between them to compensate for increased tension on the web as winding thereof progresses, and means for rolling down said web on said member as winding thereof takes place to form a tire carcass.

54. In apparatus of the class described, the combination of a core structure comprising a core body and a pair of bead rings disposed upon opposite sides of the core body and arranged circumferentially of and spaced from its under sides to form bead pockets, and means for feeding a beaded web to said core structure for winding thereon with the beads tensioned in side by side relation on said rings.

55. In apparatus of the class described, the combination of a core structure comprising a core body and a pair of bead rings disposed upon opposite sides of the core body and extending laterally therefrom at substantially right angles and spaced from its under sides to form bead pockets, and means for feeding a beaded web to said core structure for winding thereon with the beads tensioned in side by side relation on said rings.

56. In apparatus of the class described, the combination of a frame, a core body rotatably mounted on said frame, means for feeding tire material having bead elements incorporated in its side edges, bead rings upon which the beaded edges of the material are helically wound and positioned, with their edges in a plane at right angles to the core body, means for securing the bead rings in fixed relation to said core body, and means for operating said feeding means and core body in correlation to effect winding of the beaded edges of the material under tension.

In testimony whereof, I have signed my name to this specification.

HOWARD I. MORRIS.

CERTIFICATE OF CORRECTION.

Patent No. 1,677,400.  Granted July 17, 1928, to

HOWARD I. MORRIS.

It is hereby certified that error appears in the printed specification of the above numbered patent requiring correction as follows: Page 6, line 70, for the word "trust" read "thrust"; page 8, line 116, for the word "as" read "is"; page 10, line 83, strike out the word "as"; page 12, line 27, for the word "veriations" read "variations"; page 15, line 93, claim 37, for the word "holding" read "rolling"; page 17, lines 2 and 3, claim 48, for the word "feedin" read "feeding"; and that the said Letters Patent should be read with these corrections therein that the same may conform to the record of the case in the Patent Office.

Signed and sealed this 28th day of August, A. D. 1928.

(Seal)

M. J. Moore,
Acting Commissioner of Patents.